US011526607B2

(12) United States Patent
Prvulovic et al.

(10) Patent No.: US 11,526,607 B2
(45) Date of Patent: Dec. 13, 2022

(54) SYSTEMS AND METHODS FOR RUNTIME PROGRAM MONITORING THROUGH ANALYSIS OF SIDE CHANNEL SIGNALS

(71) Applicant: Georgia Tech Research Corporation, Atlanta, GA (US)

(72) Inventors: Milos Prvulovic, Atlanta, GA (US); Alenka Zajic, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/063,195

(22) Filed: Oct. 5, 2020

(65) Prior Publication Data

US 2021/0073381 A1    Mar. 11, 2021

Related U.S. Application Data

(63) Continuation of application No. 15/406,267, filed on Jan. 13, 2017, now Pat. No. 10,810,310.

(60) Provisional application No. 62/278,706, filed on Jan. 14, 2016.

(51) Int. Cl.
*G06F 21/55* (2013.01)
*G06F 1/28* (2006.01)
*G06F 21/75* (2013.01)

(52) U.S. Cl.
CPC .............. *G06F 21/556* (2013.01); *G06F 1/28* (2013.01); *G06F 21/552* (2013.01); *G06F 21/755* (2017.08)

(58) Field of Classification Search
CPC ........ G06F 21/556; G06F 1/28; G06F 21/552; G06F 21/755
See application file for complete search history.

(56) References Cited

U.S. PATENT DOCUMENTS

| | | | | |
|---|---|---|---|---|
| 10,122,747 B2‡ | 11/2018 | Mahaffey | ............... | H04L 41/142 |
| 10,157,278 B2‡ | 12/2018 | Aguayo Gonzalez | . | G01R 21/00 |
| 10,395,032 B2‡ | 8/2019 | Keller | .................... | G06F 21/567 |
| 2011/0270792 A1‡ | 11/2011 | Browne | ............... | G06K 9/6277 |
| | | | | 706/48 |
| 2014/0115405 A1* | 4/2014 | Condorelli | ............ | G06F 21/577 |
| | | | | 714/47.1 |
| 2014/0324409 A1* | 10/2014 | Ben Simhon | ....... | G06F 11/3447 |
| | | | | 703/22 |

(Continued)

OTHER PUBLICATIONS

Liu, Hong, Hongmin Li, and Eugene Y. Vasserman. "Practicality of using side-channel analysis for software integrity checking of embedded systems." International Conference on Security and Privacy in Communication Systems. Springer, Cham, 2015. (Year: 2015).*

(Continued)

*Primary Examiner* — Michael R Vaughan
(74) *Attorney, Agent, or Firm* — Troutman Pepper Hamilton Sanders LLP; Ryan A. Schneider

(57) ABSTRACT

A method of receiving one or more signals emanated from a monitored device, signal processing, based on a software model and a hardware-software (HW/SW) interaction model of the monitored device, one or more signals to determine if an anomaly exists in one or more signals, and responsive to determining that an anomaly exists based on the signal processing, transmitting an indication of the anomaly.

12 Claims, 7 Drawing Sheets

(56) References Cited

U.S. PATENT DOCUMENTS

| | | | | |
|---|---|---|---|---|
| 2016/0021121 | A1* | 1/2016 | Cui | G06F 21/54 |
| | | | | 726/1 |
| 2016/0149776 | A1* | 5/2016 | Pani | H04L 63/1416 |
| | | | | 709/224 |
| 2016/0342791 | A1‡ | 11/2016 | Aguayo Gonzalez | G01R 21/00 |
| 2017/0024660 | A1* | 1/2017 | Chen | G06F 21/552 |
| 2018/0007074 | A1‡ | 1/2018 | Kune | G06F 1/28 |
| 2019/0163900 | A1‡ | 5/2019 | Zhang | G05B 19/4184 |

OTHER PUBLICATIONS

N. Walkinshaw, R. Taylor and J. Derrick, "Inferring Extended Finite State Machine models from software executions," 2013 20th Working Conference on Reverse Engineering (WCRE), 2013, pp. 301-310, doi: 10.1109/WCRE.2013.6671305. (Year: 2013).*

Walkinshaw, N., Taylor, R. & Derrick, J. Inferring extended finite state machine models from software executions. Empir Software Eng 21, 811-853 (2016). (Year: 2015).*

Callan, et al., "FASE: finding amplitude modulated side-channel emanations," Proceedings of the 42nd Annual International Symposium on Computer Architecture, Portland, OR, USA, Jun. 13-17, 2015, pp. 592-603.‡

Callan, et al., "A practical methodology for measuring the side-channel signal available to the attacker for instruction-level events," 47th Annual IEEE/ACM International Symposium on Microarchitecture, MICRO 2014, Cambridge, United Kingdom, Dec. 13-17, 2014, pp. 242-254.‡

Sehatbakhsh, et al., "Spectral Profiling: Obserer-Effect-Free Profiling by Monitoring EM Emanations," Microarchitecture (MICRO), 49th Annual IEEEE/ACM International Symposium Oct. 15-19, 2016.‡

Zajic, et al., Experimental Demonstration of Electromagnetic Information Leakage From Modern Processor-Memory Systems. IEEE Transactions on Electromagnetic Compatibility, 56(4):885-893, 2014.‡

Callan, et al., "Zero-overhead profiling via EM emanations," In Proceedings of the 25th International Symposium on Software Testing and Analysis, ISSTA 2016, Saarbrücken, Germany, Jul. 18-20, 2016, pp. 401 412.‡

Msgna, et al., "Verifying Software Integrity in Embedded Systems: A Side Channel Approach. In Constructive Side-Channel Analysis and Secure Design," pp. 261-280. Springer 2015.‡

Genkin, et al., "Get Your Hands Off My Laptop: Physical Side-Channel Key-Extraction Attacks on PCs," CHES '14', 2014.‡

Andronio, et al., HELDROID: Dissecting and Detecting Mobile Ransomware. In Research in Attacks, Intrusions, and Defenses—18th International Symposium, RAID 2015, Kyoto, Japan, Nov. 2-4, 2015, Proceedings, pp. 382-404.‡

Clark, et al., "Wattsupdoc: Power side channels to nonintrusively discover untargeted malware on embedded medical devices," Presented as part of the 2013 USENIX Workshop on Health Information Technologies, 2013.‡

\* cited by examiner
‡ imported from a related application

SYSTEMS AND METHODS FOR RUNTIME PROGRAM MONITORING THROUGH ANALYSIS OF SIDE CHANNEL SIGNALS

CROSS-REFERENCE TO RELATED APPLICATIONS

This application is a continuation of U.S. patent application Ser. No. 15/406,267, filed 13 Jan. 2017, which claims benefit under 35 USC § 119(e) of US Provisional Patent Application No. 62/278,706, filed 14 Jan. 2016, each of which is incorporated herein by reference in its entirety as if set forth herein.

STATEMENT REGARDING FEDERALLY SPONSORED RESEARCH OR DEVELOPMENT

This disclosure was made with government support under grant number 1318934 awarded by the National Science Foundation, and grant number FA9550-14-1-0223 awarded by the United States Air Force Office of Scientific Research. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The various exemplary embodiments of the disclosure relate generally to methods and systems for performing runtime program monitoring performed externally from the system, including security monitoring, software profiling and debugging.

2. Background

In the related art, runtime monitoring a system is performed from within the system itself. Thus, in the related art, to perform monitoring, a system either must be designed to include monitoring features or modified to include such features after the fact. Such monitoring schemes, however, are vulnerable to tampering in a case of a full compromise of the monitored device. Accordingly, monitoring performed externally from the system is desirable.

Such external monitoring can be provided through the use of side channel analysis. Side channel analysis typically takes advantage of physical or micro-architectural side-effects of computation, which allows side channel analysis to bypass traditional access controls and protections. In other words, instead of accessing and/or monitoring the computation's overt (i.e., program- and ISA-specified) functionality, side channel analysis utilizes the fact that computation performed on a physical device transfers much more information than just the desired input-output information. And because computation involves a large variety of electronic and micro-architectural activity, there are numerous possible side channels by which the unintended information transfers can occur (i.e., side channel exploits).

In some instances, side channel analysis is used for nefarious purposes, for example, in side-channel attacks. Such side channel attacks can use information that is acquired from an unintended information transfer (i.e., a leak or information leakage) from a physical implementation of a system. This leaked information can then be used to steal data or thwart encryption. Example side channel attacks can be classified as timing attacks, power-monitoring attacks, electromagnetic (EM) attacks, acoustic and thermal attacks, differential-fault attacks, bus-snooping attacks, cache-based attacks, among others. Timing and power attacks are based on measuring the time and power that a system needs to perform particular operations (e.g., encryption operations). Electromagnetic attacks are based on leaked electromagnetic radiation, acoustic attacks exploit the sound (i.e., acoustic "noise") produced by a system as it carries out computation, and thermal attacks rely on variations in system temperature when different operations are executed. Differential-fault attacks induce faults in a computation in order to discover inner states of systems. Cache-based attacks use a malicious process running on the same machine to extract secrets by observing which memory blocks are accessed by the target application. Other micro-architecture-based side channel attacks have been reported and include attacks based on branch prediction or instruction caches.

FIG. 1 illustrates an exemplary side channel attack that takes advantage of side channel analysis. In the example, while at a coffee shop, investment banker Alice makes several stock trades and writes sensitive emails using an encrypted connection to her employer's server. Alice's back is against the wall of the coffee shop because she does not want others to observe what she is doing. But the coffee shop is known to be visited frequently by investment bankers, so at the next table, Eve is recording EM emanations from Alice's laptop using an antenna hidden in a briefcase, Evan has installed a microphone under Alice's table to try to collect sound emanations from her laptop, and Evita has attached a power meter, disguised as a battery charger, into the wall socket where Alice's laptop is plugged in. Eve, Evan, and Evita can use one or more of the recorded EM emanations, the recorded sounds, or the power use to determine what processes were performed by Alice's laptop. For example, the EM emanations, sounds, and power use can be used to determine an encryption algorithm performed by Alice's laptop.

While side channel attacks can be used for nefarious purposes, similar techniques and concepts can be used to learn about a system's functionality and then to monitor and protect that system. Side channel analysis and/or analog malware detection traditionally follows an approach where training signal traces are obtained. The traces can be aligned to correct for small timing variations in the signal (e.g., through some variant of time warping), and then feature extraction is performed. Various approaches differ in which type of features they use (e.g., sample mean, variance, skewness, kurtosis, etc.), in which domain (time or frequency) a feature is observed, and the duration of the window over which the feature is computed. Machine learning can be applied to learn "normal" behavior. After training, new signal traces are obtained, subjected to similar signal processing, and compared to learned "normal" program behavior. The decision to report an anomaly is then made using a decision matrix, for example, the difference between the entropy of the feature and the entropy of the feature conditioned on the class label, maximum entropy, maximum differential entropy, etc.

But while this traditional approach can work well on highly repetitive codes (e.g., cryptographic algorithms and embedded signal processing), the traditional approach is less useful for more complex software where execution paths and timing are highly input and data dependent, and for modern processor implementations where various hardware events can dramatically change execution timing and the resulting signals.

In addition, even with sophisticated probes, filtering, and pre-processing, signals used for monitoring can contain a substantial amount of noise. Further, signals produced by modern computing devices also exhibit high variation in both signal "shape" and timing, even when produced by a same physical system executing a same program code at different times or with different data values. A simple approach to accommodating this variability (i.e., ignoring certain differences) may not sufficiently address this variability issue as caches and branch prediction can introduce dramatic timing and hardware execution differences, such that variation between the executions of a code section at different times or with different data can be greater than the variation between different code sections.

Therefore, to address these problems with techniques and systems for performing runtime program monitoring performed externally from the system, there is a need for improved systems and techniques that are able to accommodate a wide range of system executions.

BRIEF SUMMARY OF THE DISCLOSURE

Briefly described, in an exemplary embodiment, the goal of the present invention is to provide accurate and precise security monitoring of embedded, mission- specific, and traditional computing devices and their software, while keeping the monitoring device completely separate for the protected system. This goal far exceeds the capabilities of existing security monitoring mechanisms, and the present invention's approach and design represents a significant advance in the state of the art that is likely to revolutionize security monitoring by eliminating the need for the monitored device itself to incorporate the required resources and mechanisms for monitoring its own operation, and by preventing even a full compromise of the monitored device from compromising the monitoring functionality.

One significant advantage in comparison to existing analog monitoring systems is that the present invention obtains a better signal, extracts more information from the signal by exploiting subchannels, and uses models of software and hardware behavior to dramatically and intelligently reduce the amount of signal information and of the present invention's computation required to accurately monitor the target system. The present invention system is relatively general and can monitor many types of devices, as long as the emanations from the device are within the capabilities of its signal acquisition front-end, and as long as the same or similar device and its software are characterized a priori or can observed long enough in their correct-execution state to infer a good model and model parameters for how their software and hardware affect their electromagnetic signals.

The present invention leverages involuntary electromagnetic (EM) emanations, that are produced as a side effect of computation in monitored devices. The present invention collects these signals using purpose-designed, highly sensitive and directional, probe and antenna arrays. These signals can then be amplified, filtered, and pre-processed. This step can eliminate the components of the signal that carry almost no information but significantly contribute to noise, separates the signals into sub-channels that carry information about different aspects of the system's state from the monitored system to the antenna/probe.

The present invention can then attempt to recognize program activity from these signals. Even with sophisticated antennae/probes, filtering, and pre-processing, the signals used for this recognition are very noisy. Therefore, it would be difficult to achieve even reasonable accuracy by finding the best match among reference signals that correspond to all possible code points in the application, even if all these reference signals are collected in a prior training.

Instead, the present invention uses a model of software activity, e.g., a control-flow graph, to drive a multi-hypothesis model that recognizes the sequence of code points that have been executed. Specifically, the present invention can form hypotheses about what program code the signal corresponds to (e.g., basic block A, M, or X may be good matches for the signal), and assigns a probability to each hypothesis based on how closely the observed signal matches the expectation under that hypothesis. Then it uses the model of the software to extend each hypothesis, e.g., if A was executed then the program only allows B or C to execute next, so now we may have hypotheses AB, AC, ML, MK, XY, and XZ.

The next part of the signal can then be matched against each of these refined hypotheses, e.g., the next part of the signal may be a good match for B, C, or K, but not for L, Y, Z, so the remaining likely hypotheses are AB, AC, and MK while ML, XY, and XZ are much less likely. To keep the number of hypotheses manageable, the present invention can remove from considerations those hypotheses that are much less likely that the best ones, e.g., ML, XY, and XZ may be rejected.

When all remaining hypotheses have the same prefix, that prefix is considered to be confirmed but the refinement process continues. For example, when only ABT and ACR remain the present invention will believe that A has been executed first, and when all remaining hypotheses become highly unlikely the present invention reports an anomaly such as code injection, modification, or control flow violation.

Signals produced by modern computing devices also exhibit high variation in both signal "shape" and timing, even when they are produced by executing the same code on the same hardware with different data values or even at different times. A naive approach to accommodating this variability would be to treat it as "random" variation, i.e., to ignore the aspects of the signal that vary among dynamic execution instances of the same code. Unfortunately, even very simple embedded processors have features such as caches and branch prediction that introduce dramatic timing and actual-hardware-activity variation, so signal variation for one static code point can be much larger than the average difference between it and another code point, resulting in highly inaccurate matching results. Instead, the present invention uses models of software activity, software-hardware interaction, and the hardware's emanation-producing mechanisms, to determine which code point, when executed of real hardware, corresponds to the observed signal (including its variation). This approach overcomes the problems introduced by variations in execution, and in fact exploits variations to improve recognition.

Additionally, the present invention can maintain statistics so it can use multiple dynamic instances of the same code to detect fine-grain anomalies, e.g., injection or modification of one instruction, that may not be reliably detectable by observing a single dynamic instance of that code. While noise causes signal variation, that variation has statistical properties that can be verified. For example, an average computed over several dynamic instances should average out. A modification that slightly changes the signal may be masked by noise when observing a single dynamic instance but is revealed when average over several dynamic instances fails to converge toward expected one.

The present invention can combine the information available in all of the sub-channel signals, which allows it to discriminate between expected behavior and other similar behaviors. For example, if the signal that corresponds to the processor core activity includes signal variation that appears to correspond to a long-latency off-chip memory access, but the signal that corresponds to memory activity contradicts that (no memory activity at that time), the "it's an off-chip cache miss" hypothesis becomes highly unlikely. This multi-channel analysis allows the present invention to, for example, discover a code injection that adds idle time after injected activity to make its timing and processor-activity signal level consistent with an off-chip memory access.

To reduce the computational and sensing cost of the present invention and allow it to monitor the target device, or even multiple target devices, in real time, the present invention can also include a relatively low-cost monitoring mechanism—spectral monitoring—where the overall spectrum of the emanations is examined to identify the application's activity at a coarser (module/loop) granularity and verify that some of its properties match expectations. In exemplary approaches where the coarse-grain and fine-grain monitoring can be integrated, a first includes a low-cost approach to perform spectrum monitoring continuously in real time, while detailed signal analysis is only performed on samples of the signal. The samples are long enough to enable accurate sequence-of-code-points recognition and analysis. These samples are not collected randomly—information from spectral monitoring allows selection of signals from parts of the code that have not recently been subjected to detailed analysis, or signals whose spectra had a higher-than-usual (but not conclusive) amount of deviation from the expected spectral behavior. This approach achieves relatively timely (but not real time) detection of fine-grain deviations and very quick detection (via spectral profiling) of large anomalies.

Overall, a significant advantage of the present invention relative to traditional monitoring schemes is that the monitoring is performed from outside of the unmodified monitored device. It obtains a better signal, extracts more information from the signal by exploiting sub-channels, and uses models of software and hardware behavior to dramatically and intelligently reduce the amount of signal information and of the present invention computation required to accurately monitor the target system. The present invention is general and can monitor many types of devices, as long as the emanations from the device are within the capabilities of its signal acquisition front-end, and as long as the same or similar device and its software are characterized a priori or can observed long enough in their correct-execution state to infer a good model and model parameters for how their software and hardware affect their EM signals.

In an exemplary embodiment, the present invention is a method comprising receiving a signal from a monitored device comprising hardware and running a software program, and monitoring the signal representative of an actual execution of the software program running on the monitored device based upon a probabilistic software (SW) model representative of an expected normal execution of the software program running on the monitored device, and an expected normal set of hardware/software interaction events of the software program running on the monitored device.

The probabilistic SW model can define a set of program executions that are possible during the expected normal execution of the program executions on the monitored device.

The method can further comprise determining a probability that the monitored device is compromised.

Determining that the monitored device is compromised can be based upon the monitoring of the signal representative of the actual execution of the software program running on the monitored device.

Determining that the monitored device is compromised can comprise applying signal processing to the received signal to compute the probability that an anomalous event is uncovered within the actual execution of the program executions on the monitored device.

Determining the probability that the monitored device is compromised can be based upon a difference between the actual execution of the software program running on the monitored device, and the expected normal execution of the software program running on the monitored device.

Determining the probability that the monitored device is compromised can be based upon a difference between the actual execution of the software program running on the monitored device, and both the expected normal execution of the software program running on the monitored device and the expected normal execution of the set of hardware/software interaction events of the software program running on the monitored device.

The method can further comprise performing spectral monitoring on the signal to identify a loop or program module of program code in the actual execution of the software program running on the monitored device.

The method can further comprise determining code blocks executed by the monitored device corresponding to the signal, wherein at least one code block is selected from the group consisting of a loop and a program module of program code.

The probabilistic SW model can comprise one or more of a control flow graph (CFG) at basic code block granularity, instruction-level representation of the program, and intermediate-representation of the program.

The expected normal set of hardware/software interaction events of the software program running on the monitored device can be based upon a probabilistic hardware-software (HW/SW) interaction model.

In another exemplary embodiment, the present invention is a method comprising receiving a signal from a monitored device comprising hardware and running a software program, and monitoring the signal representative of an actual execution of the software program running on the monitored device based upon a probabilistic software model representative of an expected normal execution of the software program running on the monitored device, and a probabilistic hardware-software interaction model representative of an expected normal set of hardware/software interaction events of the software program running on the monitored device.

The probabilistic SW model can define a set of program executions that are possible during the expected normal execution of the program executions on the monitored device.

The probabilistic HW/SW interaction model can define a set of hardware/software interaction events that are possible at each point during the expected normal software execution of the program executions on the monitored device.

The method can further comprise determining a probability that the monitored device is compromised.

Determining that the monitored device is compromised can be based upon the monitoring of the signal representative of the actual execution of the software program running on the monitored device.

Determining that the monitored device is compromised can comprise applying signal processing to the received signal to compute the probability that an anomalous event is uncovered within the actual execution of the program executions on the monitored device.

Determining the probability that the monitored device is compromised can based upon a difference between the actual execution of the software program running on the monitored device, and the expected normal execution of the software program running on the monitored device.

Determining the probability that the monitored device is compromised can be based upon a difference between the actual execution of the software program running on the monitored device, and both the expected normal execution of the software program running on the monitored device and the expected normal execution of the set of hardware/software interaction events of the software program running on the monitored device.

The method can further comprise performing spectral monitoring on the signal to identify a loop or program module of program code in the actual execution of the software program running on the monitored device.

The method can further comprise determining code blocks executed by the monitored device corresponding to the signal, wherein at least one code block is selected from the group consisting of a loop and a program module of program code.

The probabilistic SW model can comprise one or more of a CFG at basic code block granularity, instruction-level representation of the program, and intermediate-representation of the program.

In another exemplary embodiment, the present invention is a method comprising wirelessly receiving signals emanating from a monitored device comprising hardware and executing program code, signal processing the signals based upon a software model representative of an expected normal execution of the program code, and an expected normal set of hardware/software interaction events of the program code, determining from the signal processing a probability that the monitored device is compromised based upon determining an anomalous event exists within an actual execution of the program code, and transmitting data indicative of the probability that the monitored device is compromised.

Determining the probability that the monitored device is compromised can comprise performing spectral monitoring on the wireless signals.

The expected normal set of hardware/software interaction events of the program code can be based upon a probabilistic hardware-software interaction model.

The signal processing can comprise processing, responsive to determining the probability that the monitored device is compromised and based on the SW model and the HW/SW interaction model of the monitored device, the portion of the wireless signals having led to the determined probability that the monitored device is compromised.

The method can further comprise matching the wireless signals to the actual execution of the program code by the monitored device, and collecting statistics over multiple instances of the wireless signals being matched to the actual execution of the program code by the monitored device, wherein determining the probability that the monitored device is compromised is further based on the statistics.

The software model can be developed based on static analysis of the program code and observed signals obtained from dynamic analyses of the monitored device.

The method can further comprise detecting the signals emanated from the monitored device using a sensor, performing, on the detected signals, at least one of location identification of the detected signals, beam forming, and interference cancellation to create enhanced signals, and separating the enhanced signals into at least one sub-channel.

The signal processing can comprise multi-hypothesis testing with a trellis search.

The SW model can define a set of program executions that are possible during uncompromised software execution of the program code in the monitored device.

The HW/SW interaction model can define the set of hardware/software interaction events that are possible at each point during the uncompromised software execution of the program code on the monitored device.

The signals emanating from the monitored device can be selected from the group consisting of unintended information transfers, information leakages and side channels.

The HW/SW interaction model can provide predictive signals reflective of a set of computational activities reflective of the processing activity of the monitored device that is uncompromised, and wherein the signal processing determines a variance between the received signals and the predicted signals.

The SW model can define a set of program executions that are possible during uncompromised software execution of the program code in the monitored device, wherein the HW/SW interaction model defines the set of hardware/software interaction events that are possible at each point during the uncompromised software execution of the program code on the monitored device, and wherein the method further comprises performing spectral monitoring on the signals to identify a loop or program module of the actual execution of the program code at a point in time corresponding to the signals.

The method can further comprise determining whether enhanced granularity in the program code identification is required, and responsive to determining that enhanced granularity is required, signal processing, based on the SW model and the HW/SW interaction model of the monitored device, sub-channels to determine, at the finer granularity, a portion in the actual execution of the program code at the point in time corresponding to the signals.

The method can further comprise reconstructing, based on either the identified loop or program module, an execution path of the actual execution of the program code by the monitored device.

The method can further comprise attributing a program execution time to either the identified loop or program module of the program code.

The method can further comprise identifying, based on the attributing, program code portions that the monitored device spends a significant fraction of execution time.

In another exemplary embodiment, the present invention is a method comprising receiving signals emanated from a monitored device executing program code having a program code granularity, and responsive to receiving the signals, performing, based on a software model having a finer granularity than the program code granularity and a hardware-software interaction model of the monitored device, signal processing on one or more of the signals;

wherein performing signal processing comprises processing one or more signals to determine a code block in the executed program code by the monitored device corresponding to one or more of the signals, wherein the software model comprises at least two states of the program code, and wherein during uncompromised software execution of the program code, at least one of the states of the software model are executed.

In another exemplary embodiment, the present invention is a method comprising storing a set of predicted computational activities reflective of a processing activity of a monitored device that is uncompromised, wirelessly receiving signals emanating from the monitored device, the signals reflective of a set of actual computational activities of the monitored device during the processing activity, determining a probability that the monitored device is compromised by evaluating variance between the set of predicted computational activities to the set of actual computational activities, which provides a probability that an anomalous event exists within the actual computational activities of the monitored device, and transmitting data indicative of the probability that an anomalous event exists, wherein if the probability that an anomalous event evidences an actual anomalous event, the data indicative of the actual anomalous event comprises at what point in the processing activity the anomalous event occurred, and when the anomalous event occurred.

The set of predicted computational activities can be provided by a software model and a hardware-software interaction model of the monitored device.

The SW model can define a set of program executions that are possible during uncompromised software execution in the monitored device, and wherein the HW/SW interaction model defines the set of hardware/software interaction events that are possible at each point during the uncompromised software execution on the monitored device.

The signals emanating from the monitored device can be selected from the group consisting of unintended information transfers, information leakages and side channels.

In another exemplary embodiment, the present invention is a method comprising receiving at a first sensor a first form of electro-magnetic emanation from a monitored device executing program code, receiving at a second sensor a second form of electro-magnetic emanation from the monitored device, responsive to receiving signals reflective of the first and second forms of electro-magnetic emanations from the first and second sensors, performing, based on a software model and a hardware-software interaction model of the monitored device, signal processing on the signals, and responsive to receiving the signals from the first and second sensors, performing spectral monitoring on the signals to identify a loop or program module of program code that is being executed by the monitored device at a point in time corresponding to the signals.

The second set of signals can be used as training, i.e., to form the software model and a hardware-software interaction model based on the second set of signals, and then monitor execution that corresponds to the first set of signals. Thus, the models are derived from training signals without actual analysis of the code.

The SW model can be a probabilistic SW model representative of an expected normal execution of the program code executing on the monitored device, and wherein the HW/SW interaction model is a probabilistic HW/SW interaction model representative of an expected normal set of hardware/software interaction events of the program code executing on the monitored device.

The method can further comprise determining whether enhanced granularity in the program code identification is required, and responsive to determining that enhanced granularity is required, signal processing, based on the SW model and the HW/SW interaction model of the monitored device, sub-channels to determine, at the finer granularity, a portion in the actual execution of the program code at the point in time corresponding to the signals.

The method can further comprise reconstructing, based on either the identified loop or program module, an execution path of the actual execution of the program code by the monitored device.

The method can further comprise attributing a program execution time to either the identified loop or program module of the program code.

The method can further comprise identifying, based on the attributing, program code portions that the monitored device spends a significant fraction of execution time.

In another exemplary embodiment, the present invention is a method comprising receiving a signal emanated from a monitored device, and responsive to receiving the signal, performing, based on a software model and a HW/SW interaction model of the monitored device, signal processing on the signal, wherein the signal processing comprises multi-hypothesis testing with a trellis search, and wherein the multi-hypothesis testing comprises selecting likely software blocks executed by the monitored device based on a current software trace, calculating, based on the HW/SW interaction model, distance metrics between the signal and expected one or more signals produced by the monitored device by executing the selected software blocks, calculating, based on the calculated distance metrics, probabilities of matches with the selected software blocks, and performing multi-hypothesis matching to update the current software trace to include one or more predicted software blocks of the likely software blocks.

The multi-hypothesis testing can further comprise performing trace-event alignment on the signal to account for recognized events.

The method can further comprise determining, in response to detecting an interrupt within a predicted software block for which interrupts are not allowed by the monitored system, that an anomaly exists.

The method can further comprise determining, in response to detecting a cache miss within a predicted software block for which a cache miss cannot occur at that point in the software block, that an anomaly exists.

The method can further comprise detecting either statistics or patterns of detected interrupts within a predicted software block over one or more occurrences, performing, respectively, either a statistical test or a pattern matching algorithm on the detected statistics or patterns of the detected interrupts to determine a likelihood of a valid execution of the software block, and determining, in response to performing either the statistical test or pattern matching algorithm whether an anomaly exists.

The method can further comprise detecting either statistics or patterns of detected cache misses within a predicted software block over one or more occurrences, performing, respectively, either a statistical test or a pattern matching algorithm on the detected statistics or patterns of the detected cache misses to determine a likelihood of a valid execution of the software block, and determining, in response to performing either the statistical test or pattern matching algorithm whether an anomaly exists.

In another exemplary embodiment, the present invention is a monitoring system comprising a memory, and at least one processor configured to implement a monitor configured to receive one or more signals emanated from a monitored device, an analyzer configured to signal process by multi-hypothesis testing with a trellis search, and based on a software model and a HW/SW interaction model of the monitored device, one or more of the signals, and determine, based on the signal processing, the likelihood that the monitored device is compromised, wherein the multi-hypothesis testing comprises selecting likely software blocks executed by the monitored device based on a current software trace, calculating, based on the HW/SW interaction model, distance metrics between the signal and expected one or more signals produced by the monitored device by executing the selected software blocks, calculating, based on the calculated distance metrics, probabilities of matches with the selected software blocks, and performing multi-hypothesis matching to update the current software trace to include one or more predicted software blocks of the likely software blocks.

The monitor can further be configured to perform spectral monitoring on one or more of the signals to identify potential anomalies in one or more portions of one or more of the signals, and the analyzer can further be configured to signal process, responsive to the monitor identifying a potential anomaly and based on the software model and the HW/SW interaction model of the monitored device, the one or more portions of one or more of the signals having the identified potential anomaly.

The at least one processor can be further configured to implement a verifier, the analyzer is further configured to match one or more of the signals to program code executed by the monitored device, and forward statistics of a signal indicative of the likelihood that the monitored device is compromised to the verifier, and the verifier is configured to determine, by distinguishing an anomaly based on the statistics collected over multiple instances of one or more of the signals being matched to the same program code executed by the monitored device, that an anomaly exists and that the monitored device is compromised.

The software model can be developed based on static analysis of program code executed by the monitored device and observed signals obtained from dynamic analyses of the monitored system.

One or more of the signals can be separated into at least one sub-channel, and the monitor can further be configured to buffer the at least one sub-channel in real-time.

The monitoring system can further comprise at least one electro-magnetic sensor configured to detect one or more of the signals emanated from the monitored device, wherein the monitor is further configured to perform, on the detected one or more signals, at least one of location identification of the detected one or more signals, beam forming, and interference cancellation to create enhanced signals, and separate the enhanced signals into at least one sub-channel.

The multi-hypothesis testing can further comprise performing trace-event alignment on one or more of the signals to account for recognized events.

The analyzer can further be configured to determine, in response to detecting an interrupt within a predicted software block for which interrupts are not allowed by the monitored system, that an anomaly exists.

The analyzer can further be configured to determine, in response to detecting a cache miss within a predicted software block for which a cache miss cannot occur at that point in the software block, that an anomaly exists.

In another exemplary embodiment, the present invention is a method comprising storing a set of predicted computational activities reflective of a processing activity of a monitored device that is uncompromised, wirelessly receiving signals emanating from the monitored device, the signals reflective of a set of actual computational activities of the monitored device during the processing activity, and determining the likelihood that the monitored device is compromised by evaluating variance between the set of predicted computational activities to the set of actual computational activities, wherein the set of predicted computational activities is provided by a software model and a HW/SW interaction model of the monitored device, wherein the processing activity comprises executed software blocks, and wherein determining the likelihood that the monitored device is compromised comprises multi-hypothesis testing comprising selecting software blocks executed by the monitored device based on a current software trace, calculating, based on the HW/SW interaction model, distance metrics between the received signals and signals reflective of the set of predicted computational activities of the monitored device that is uncompromised, and calculating, based on the calculated distance metrics, probabilities of matches with the selected software blocks.

The multi-hypothesis testing can further comprise performing multi-hypothesis matching to update the current software trace to include one or more predicted software blocks, and determining, based on the multi-hypothesis matching, the likelihood that the monitored device is compromised.

In another exemplary embodiment, the present invention is a method comprising a method of runtime program monitoring including receiving one or more signals emanated from a monitored device; signal processing, based on a software model and a hardware-software interaction model of the monitored device, the one or more signals to determine if an anomaly exists in the one or more signals; and responsive to determining, based on the signal processing, that an anomaly exists, transmitting an indication of the anomaly.

The method can further include performing spectral monitoring on the one or more signals to identify potential anomalies in portions of the one or more signals. The signal processing can include signal processing, responsive to identifying a potential anomaly and based on the software model and the HW/SW interaction model of the monitored device, the portions of the one or more signals having the identified potential anomaly.

The method can further include matching the one or more signals to code executed by the monitored device; collecting statistics over multiple instances of the one or more signals being matched to a same code executed by the monitored device; and determining, by distinguishing an anomaly based on the statistics, that an anomaly exists.

The software model can be developed based on static analysis of the code and observed signals obtained from dynamic analyses of the monitored system.

The one or more signals can be separated into at least one sub-channel, and the method can further include buffering the at least one sub-channel in real-time.

The method can further include detecting the one or more signals emanated from the monitored device using at least one sensor; performing, on the detected one or more signals, at least one of location identification of the detected one or more signals, beam forming, and interference cancellation to create enhanced signals; and separating the enhanced signals into at least one sub-channel.

The signal processing can include multi-hypothesis testing with a trellis search.

The multi-hypothesis testing can include selecting likely software blocks executed by the monitored device based on a current software trace; calculating, based on the HW/SW interaction model, distance metrics between the one or more signals and expected one or more signals produced by the monitored device by executing the selected software blocks; calculating, based on the calculated distance metrics, probabilities of matches with the selected software blocks; performing multi-hypothesis matching to update the current software trace to include one or more predicted software blocks of the likely software blocks; and determining, based on the multi-hypothesis matching, if an anomaly occurred.

The multi-hypothesis testing can include performing trace-event alignment on the one or more signals to account for recognized events.

The determining can include determining, in response to detecting an interrupt within a predicted software block for which interrupts are not allowed by the monitored system, that an anomaly exists.

The determining can include determining, in response to the detecting a cache miss within a predicted software block for which a cache miss cannot occur at that point in the software block, that an anomaly exists.

The method can further include detecting statistics or patterns of detected interrupts within a predicted software block over a plurality of occurrences; performing a statistical test or a pattern matching algorithm on the detected statistics or patterns of the detected interrupts to determine a likelihood of a valid execution of the software block; and determining, in response to the statistical test or pattern matching algorithm indicating that the detected interrupts are highly unlikely in a valid execution of the software block, that an anomaly exists.

The method can further include detecting statistics or patterns of detected cache misses within a predicted software block over a plurality of occurrences; performing a statistical test or a pattern matching algorithm on the detected statistics or patterns of the detected cache misses to determine a likelihood of a valid execution of the software block; and determining, in response to the statistical test or pattern matching algorithm indicating that the detected cache misses are highly unlikely in a valid execution of the software block, that an anomaly exists.

According to some embodiments, there is provided a monitoring system including a memory; and at least one processor configured to implement a monitor configured to receive one or more signals emanated from a monitored device; an analyzer configured to signal process, based on a software model and a hardware-software interaction model of the monitored device, the one or more signals and determine, based on the signal processing, that an anomaly exists; and an anomaly reporter configured to transmit an indication of the existing anomaly.

The monitor can be further configured to perform spectral monitoring on the one or more signals to identify potential anomalies in portions of the one or more signals. The analyzer can be configured to signal process, responsive to the monitor identifying a potential anomaly and based on the software model and the HW/SW interaction model of the monitored device, the portions of the one or more signals having the identified potential anomaly.

The at least one processor can be further configured to implement a verifier, the analyzer can be further configured to match the one or more signals to code executed by the monitored device, and forward statistics of mildly-anomalous one or more signals to the verifier, and the verifier can be configured to determine, by distinguishing an anomaly based on the statistics collected over multiple instances of the signals being matched to a same code executed by the monitored device, that an anomaly exists.

The one or more signals can be separated into at least one sub-channel, and the monitor can be further configured to buffer the at least one sub-channel in real-time.

The system can further include at least one electromagnetic sensor configured to detect the one or more signals emanated from the monitored device. The monitor can be further configured to perform, on the detected one or more signals, at least one of location identification of the detected one or more signals, beam forming, and interference cancellation to create enhanced signals, and separate the enhanced signals into at least one sub-channel.

The analyzer can be configured to signal process the sub-channels by multi-hypothesis testing the sub-channels with a trellis search.

The multi-hypothesis testing can include selecting likely software blocks executed by the monitored device based on a current software trace; calculating, based on the HW/SW interaction model, distance metrics between the one or more signals and expected one or more signals produced by the monitored device by executing the selected software blocks; calculating, based on the calculated distance metrics, probabilities of matches with the selected software blocks; performing multi-hypothesis matching to update the current software trace to include one or more predicted software blocks of the likely software blocks; and determining, based on the multi-hypothesis matching, if an anomaly occurred.

The multi-hypothesis testing can include performing trace-event alignment on the one or more signals to account for recognized events.

The analyzer can be further configured to determine, in response to detecting an interrupt within a predicted software block for which interrupts are not allowed by the monitored system, that an anomaly exists.

The analyzer can be further configured to determine, in response to the detecting a cache miss within a predicted software block for which a cache miss cannot occur at that point in the software block, that an anomaly exists.

The at least one processor can further configured to implement a verifier configured to detect statistics or patterns of detected interrupts within a predicted software block over a plurality of occurrences; perform a statistical test or a pattern matching algorithm on the detected statistics or patterns of the detected interrupts to determine a likelihood of a valid execution of the software block; and determine, in response to the statistical test or pattern matching algorithm indicating that the detected interrupts are highly unlikely in a valid execution of the software block, that an anomaly exists.

The at least one processor can further configured to implement a verifier configured to detect statistics or patterns of detected cache misses within a predicted software block over a plurality of occurrences; perform a statistical test or a pattern matching algorithm on the detected statistics or patterns of the detected cache misses to determine a likelihood of a valid execution of the software block; and determine, in response to the statistical test or pattern matching algorithm indicating that the detected cache misses are highly unlikely in a valid execution of the software block, that an anomaly exists.

According to some embodiments, there is provided a method including receiving signals emanated from a monitored device executing program code; and responsive to receiving the signals, performing spectral monitoring on the signals to identify a loop or program module of program code that is being executed by the monitored device at a point in time corresponding to the signals.

The method can further include determining whether enhanced granularity in program code identification is required; and responsive to determining that enhanced granularity is required, signal processing, based on a software model and a hardware-software interaction model of the monitored device, the sub-channels to determine, at the finer granularity, a portion in the program code that is being executed by the monitored device at the point in time corresponding to the signals.

The method can further include reconstructing, based on the identified loop or program module, an execution path of the program code by the monitored system.

The method can further include attributing a program execution time to the identified loop or program module of the program code.

The method can further include identifying, based on the attributing, program code portions that the monitored system spends a significant fraction of execution time.

According to some embodiments, there is provided a method including receiving signals emanated from a monitored device executing program code; and responsive to receiving the signals, performing, based on a software model and a hardware-software interaction model of the monitored device, signal processing on the one or more signals.

These and other aspects, features, and benefits of the disclosed inventions will become apparent from the following detailed written description of the preferred embodiments and aspects taken in conjunction with the following drawings, although variations and modifications thereto can be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

Figure 1:
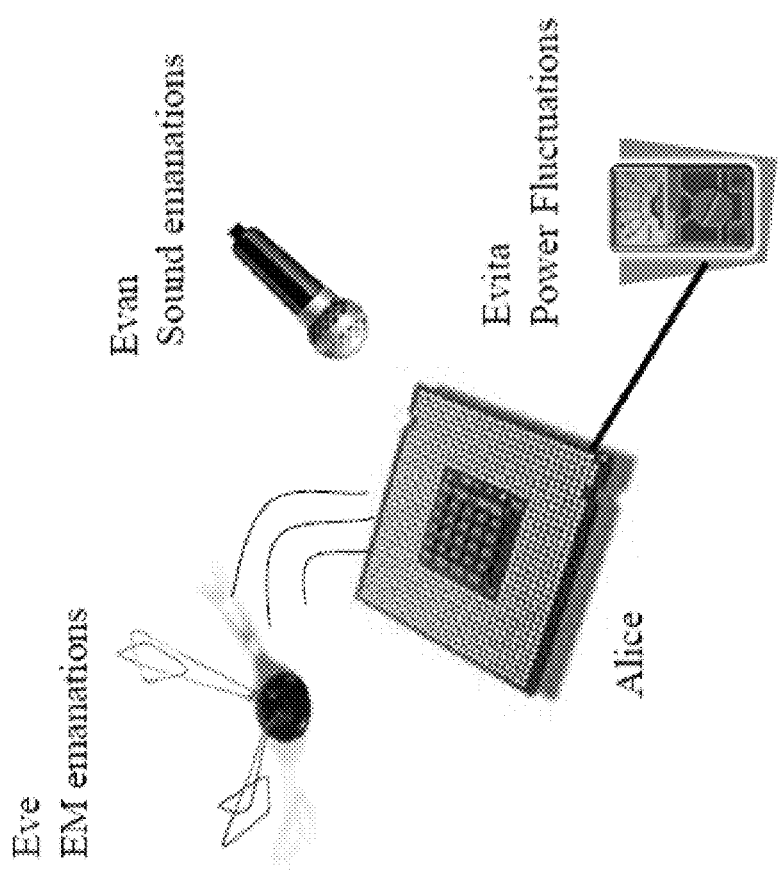
FIG. 1 illustrates an exemplary environment in which various side channel attacks can occur.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Certain embodiments of the disclosed technology provide systems and methods for performing runtime program monitoring based on emanations (e.g., EM emanations) from a monitored system. Runtime program monitoring can include, as non-limiting examples, security monitoring, program execution profiling, energy consumption profiling, software defect detection and localization in the program code. For example, a security monitoring system can monitor the emanations of a monitored system to determine whether the monitored system has been compromised. The security monitoring can include processing the emanations from the monitored system into sub-channels and analyzing the sub-channels based on hardware and software models of the monitored system and its expected emanations. In other cases, program profiling can be used to track how a program operates, for example, to determine portions of the code that are executed frequently or consumer a large amount of time or power. In some cases, program profiling can be used in order to guide software or system modification. In some cases, anomalies in a monitored system can be detected by comparing the emanations with expectations encompassed in the hardware and software models. In some cases, an anomaly can be detected by analyzing multiple executions of the same code section by the monitored system and comparing the resultant emanations to the hardware and software models.

Some implementations of the disclosed technology will be described more fully hereinafter with reference to the accompanying drawings. This disclosed technology may, however, be embodied in many different forms and should not be construed as limited to the implementations set forth herein.

Example embodiments of the disclosed technology will now be described with reference to the accompanying figures.

Figure 2:
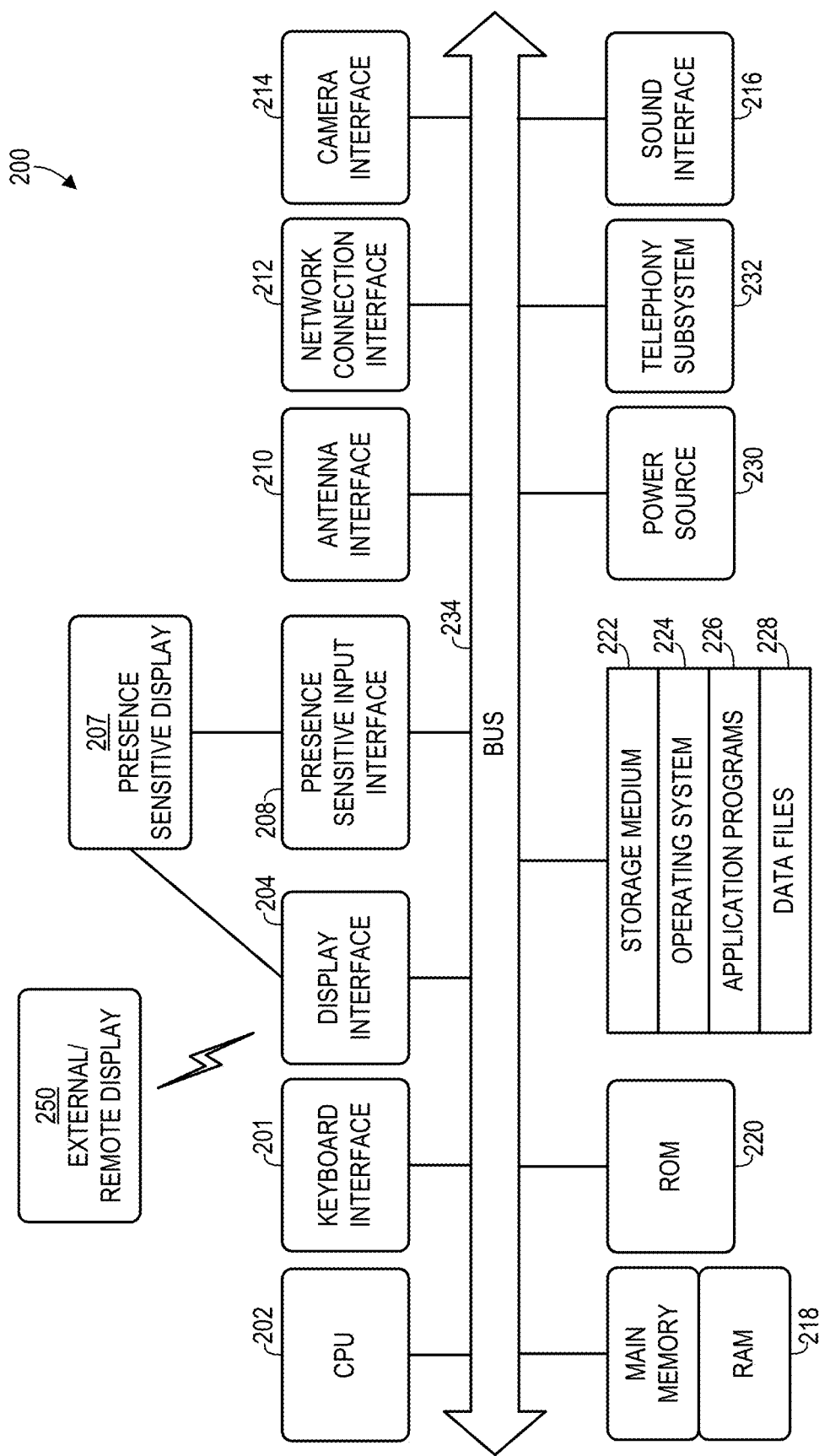
FIG. 2 is a block diagram of an illustrative computer system architecture, according to an example embodiment.

As desired, implementations of the disclosed technology can include a computing device with more or less of the components illustrated in FIG. 2. It will be understood that the computing device architecture 200 is provided for example purposes only and does not limit the scope of the various implementations of the present disclosed systems, methods, and computer-readable mediums.

The computing device architecture 200 of FIG. 2 includes a central processing unit (CPU) 202, where computer instructions are processed; a display interface 204 that acts as a communication interface and provides functions for rendering video, graphics, images, and texts on the display. In certain example implementations of the disclosed technology, the display interface 204 can be directly connected to a local display, such as a touch-screen display associated with a mobile computing device. In another example implementation, the display interface 204 can be configured for providing data, images, and other information for an external/remote display that is not necessarily physically connected to the mobile computing device. For example, a desktop monitor can be utilized for mirroring graphics and other information that is presented on a mobile computing device. In certain example implementations, the display interface 204 can wirelessly communicate, for example, via a Wi-Fi channel or other available network connection interface 212 to the external/remote display.

In an example implementation, the network connection interface 212 can be configured as a communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 204 can be operatively coupled to a local display, such as a touch-screen display associated with a mobile device. In another example, the display interface 204 can be configured to provide video, graphics, images, text, other information, or any combination thereof for an external/remote display that is not necessarily connected to the mobile computing device. In one example, a desktop monitor can be utilized for mirroring or extending graphical information that can be presented on a mobile device. In another example, the display interface 204 can wirelessly communicate, for example, via the network connection interface 212 such as a Wi-Fi transceiver to the external/remote display.

The computing device architecture 200 can include a keyboard interface 206 that provides a communication interface to a keyboard. In one example implementation, the computing device architecture 200 can include a presence-sensitive display interface 208 for connecting to a presence-sensitive display 207. According to certain example implementations of the disclosed technology, the presence-sensitive display interface 208 can provide a communication interface to various devices such as a pointing device, a touch screen, a depth camera, etc. which may or may not be associated with a display.

The computing device architecture 200 can be configured to use an input device via one or more of input/output interfaces (for example, the keyboard interface 206, the display interface 204, the presence sensitive display interface 208, network connection interface 212, camera interface 214, sound interface 216, etc.) to allow a user to capture information into the computing device architecture 200. The input device can include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device can be integrated with the computing device architecture 200 or can be a separate device. For example, the input device can be an accelerometer, a magnetometer, a digital camera, a microphone, and an optical sensor.

Example implementations of the computing device architecture 200 can include an antenna interface 210 that provides a communication interface to an antenna; a network connection interface 212 that provides a communication interface to a network. As mentioned above, the display interface 204 can be in communication with the network connection interface 212, for example, to provide information for display on a remote display that is not directly connected or attached to the system. In certain implementations, a camera interface 214 is provided that acts as a communication interface and provides functions for capturing digital images from a camera. In certain implementations, a sound interface 216 is provided as a communication interface for converting sound into electrical signals using a microphone and for converting electrical signals into sound using a speaker. According to example implementations, a random access memory (RAM) 218 is provided, where computer instructions and data can be stored in a volatile memory device for processing by the CPU 202.

According to an example implementation, the computing device architecture 200 includes a read-only memory (ROM) 220 where invariant low-level system code or data for basic system functions such as basic input and output (I/O), startup, or reception of keystrokes from a keyboard are stored in a non-volatile memory device. According to an example implementation, the computing device architecture 200 includes a storage medium 222 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 224, application programs 226 (including, for example, a web browser application, a widget or gadget engine, and or other applications, as necessary) and data files 228 are stored.

According to an example implementation, the computing device architecture 200 includes a power source 230 that provides an appropriate alternating current (AC) or direct current (DC) to power components.

According to an example implementation, the computing device architecture 200 includes and a telephony subsystem 232 that allows the device 200 to transmit and receive sound over a telephone network. The constituent devices and the CPU 202 communicate with each other over a bus 234.

According to an example implementation, the CPU 202 has appropriate structure to be a computer processor. In one arrangement, the CPU 202 can include more than one processing unit. The RAM 218 interfaces with the computer bus 234 to provide quick RAM storage to the CPU 202 during the execution of software programs such as the operating system application programs, and device drivers. More specifically, the CPU 202 loads computer-executable process steps from the storage medium 222 or other media into a field of the RAM 218 in order to execute software programs. Data can be stored in the RAM 218, where the data can be accessed by the computer CPU 202 during execution. In one example configuration, the device architecture 100 includes at least 128 MB of RAM, and 256 MB of flash memory.

The storage medium 222 itself can include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system can be tangibly embodied in storage medium 222, which can include a machine-readable storage medium.

According to one example implementation, the term computing device, as used herein, can be a CPU, or conceptualized as a CPU (for example, the CPU 202 of FIG. 2). In this example implementation, the computing device (CPU) can be coupled, connected, and/or in communication with one or more peripheral devices, such as display. In another example implementation, the term computing device, as used herein, can refer to a mobile computing device such as a smartphone, tablet computer, or smart watch. In this example embodiment, the computing device can output content to its local display and/or speaker(s). In another example implementation, the computing device can output content to an external display device (e.g., over Wi-Fi) such as a TV or an external computing system.

In example implementations of the disclosed technology, a computing device can include any number of hardware and/or software applications that are executed to facilitate any of the operations. In example implementations, one or more I/O interfaces can facilitate communication between the computing device and one or more input/output devices. For example, a USB port, a serial port, a disk drive, a CD-ROM drive, and/or one or more user interface devices, such as a display, keyboard, keypad, mouse, control panel, touch screen display, microphone, etc., can facilitate user interaction with the computing device. The one or more I/O interfaces can be utilized to receive or collect data and/or user instructions from a wide variety of input devices. Received data can be processed by one or more computer processors as desired in various implementations of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As noted, information can be gained from a computing system's side channels when, as program instructions execute on a system processor over time, the resulting electronic activity within and outside the processor also varies over time, and that electronic activity in turn creates a detectable variation in the side channel signal that is available to the monitoring system. Aspects of the present disclosure provide systems and methods for runtime program monitoring of an overall system through the use of these side channels and their measurable signals to recognize program activity. Runtime program monitoring can include, as non-limiting examples, security monitoring, program execution profiling, energy consumption profiling, software defect detection and localization in the program code. In some instances, monitoring such side channel signals can be referred to as "Computational Activity Monitoring by Externally Leveraging Involuntary Analog Signals" or "CAMELIA."

In some instances, external systems and methods provide runtime program monitoring of an unmodified monitored device. Aspects of the disclosure generally can monitor most devices from which side channels can be detected by a signal acquisition front-end and the device's software can be characterized a priori or is observable long-enough to infer a good model for predicting the system behavior.

Figure 3:
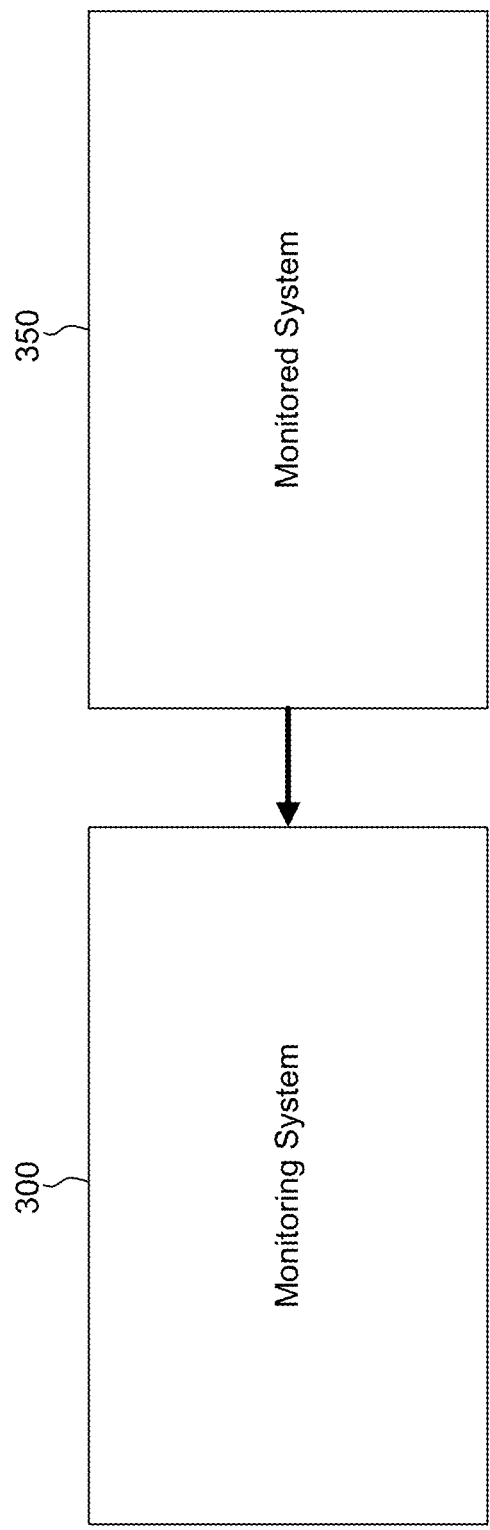
FIG. 3 is a block diagram of an operation environment of a monitoring system and a monitored system according to an example embodiment.

FIG. 3 is a block diagram of an operation environment of a monitoring system 300 according to an example embodiment. According to some embodiments, the operation environment generally includes a monitoring system 300 and a monitored system 350. The monitoring system 300 can monitor emanations from the monitored system 350 to determine a state of the monitored system 350. For example, the monitoring system 300 can use side-channel analysis to determine whether the monitored system 350 has been compromised. As a non-limiting example, the monitored system 350 can be a bank computer, and the monitoring system 300 can monitor emanations from the bank computer to determine whether the bank computer has been compromised by a malicious third party. As another non-limiting example, the monitored system 350 can include an Internet of things (IoT) device or an embedded system, and the monitoring system 300 can monitor emanations from the IoT device or the embedded system to ensure correct operation.

Figure 4:
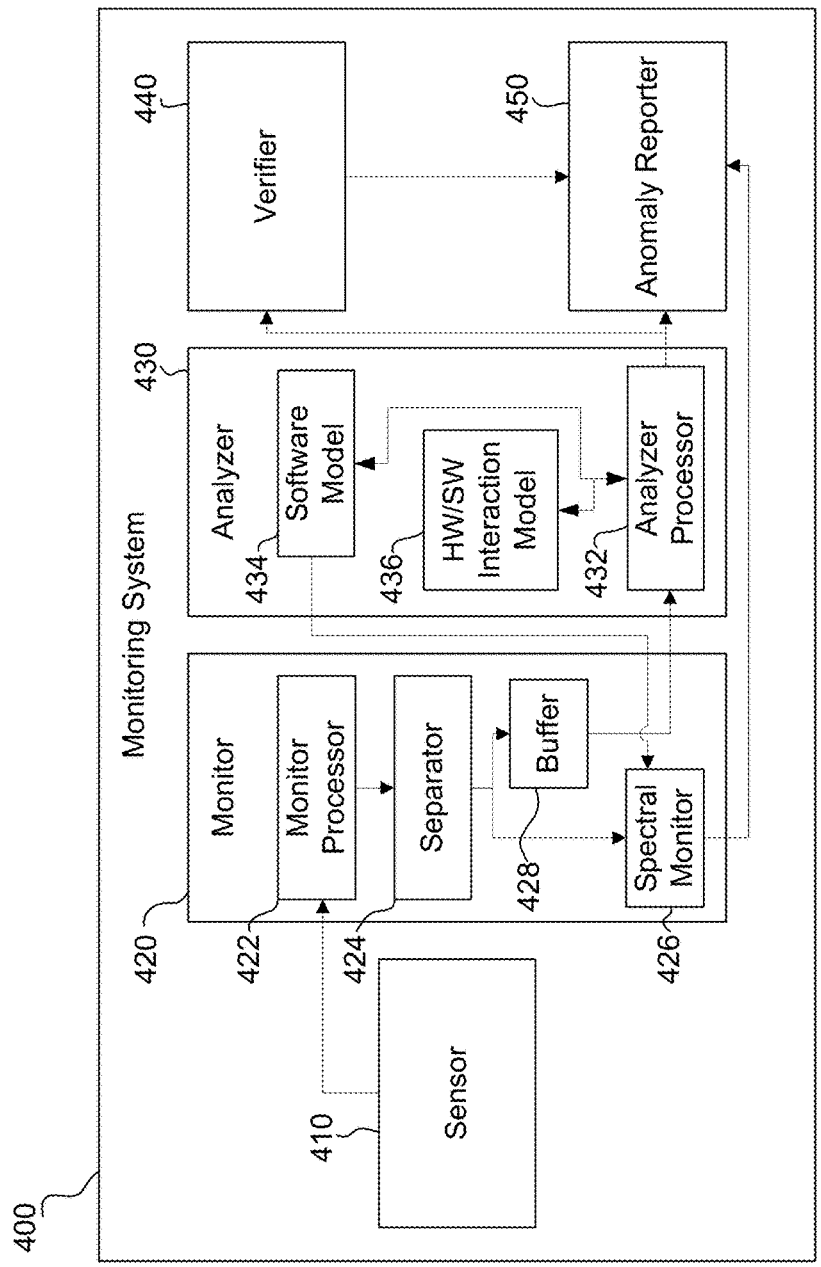
FIG. 4 is a block diagram of a monitoring system according to an example embodiment.

FIG. 4 is a block diagram of a system according to an example embodiment. In example embodiments, the monitoring system 300 can perform a method that uses inadvertent electro-magnetic ("EM") emanations (e.g., side channel emissions, side channel exploits, side channel leaks) of the target system (e.g., the monitored system 350) to wirelessly monitor the target system. A monitoring system 300 can include some or all of the components shown in the FIG. 2 computing device architecture 200. In some embodiments, and as shown in FIG. 4, the monitoring system 300 can include a sensor 410, a monitor 420 (which can be one or more processors), an analyzer 430, a verifier 440, and an anomaly reporter 450. In some embodiments, the sensor 410, the monitor 420, the analyzer 430, the verifier 440, and the anomaly reporter 450, are embodied as hardware, software, or a combination of hardware and software.

The sensor 410 can detect signals from a monitored device (i.e., the monitored system 350) using, for example, a sophisticated purpose-designed antenna/probe array that can detect and amplify signals (i.e., side channel emissions). The monitor 420 can process the signals to identify, for example, potential anomalies and trigger deeper analysis. In some cases, the monitor 420 can include a monitor processor 422 to perform, for example, identification of what directions the signals are coming from, beam forming, and interference cancellation to enhance the signals from the monitored device while suppressing other signals. The monitor 420 can further include a separator 424 to separate the enhanced signals into sub-channels (e.g., by frequency and/or other characteristics) that correspond to different aspects of monitored activity of the monitored system (e.g., processor, memory, power supply, etc.). A spectral monitor 426 can perform spectral monitoring of the various sub-channels by, for example, applying fast analyses to the overall spectrum of the signal and to the most prominent features in the time-domain signal. The spectral monitor 426 also may, for example, identify potential anomalies, report the potential anomalies to the anomaly reporter 450, and trigger deeper analysis by the analyzer 430. The monitor 420 also can include a buffer 428 that buffers the signals. The buffer 428 can buffer the signals continuously and in real-time to enable the deeper analysis of the signals.

In some embodiments, the monitor 420 can perform first signal analysis that efficiently detects possible anomalies. For example, in some embodiments, efficiently detecting possible anomalies can constitute the monitor 420 processing the signals to identify loops and other repetitive activity being performed by the monitored device 350. In some cases, loops and other repetitive activities can be relatively efficiently identified with a high degree of confidence based on spectrum features or through analysis in the time-domain. Although the monitor 420 in FIG. 4 includes a spectral monitor 426 (i.e., a unit for performing analysis in the spectral domain such as spectral matching), this is merely an example. In some cases, the monitor 420 can include one or more units or components for performing time-domain analysis to perform an initial analysis of the signals emanated from the monitored system 350. As another example, in some embodiments, the monitor 420 may not perform an initial analysis, but can merely prepare signals for deeper analysis by the analyzer 430.

In some embodiments, the monitoring system 300 can perform program profiling to track how a program operates in the monitored system 350. For example, the monitoring system 300 can determine specific loops or program modules executed at particular points in time by the monitored system 350. In some instanced, the monitoring system 300 can identify portions of program code that are executed frequently (e.g., a certain percentage of the distinct program module executions) or consume a large amount power. In some cases, the monitoring system 300 can attribute program execution time to portions of the program code and identify portions of the program code in which the program spends a signification portion of its execution time (e.g., 1% or more). In some cases, the monitoring system 300 can reconstruct an execution path of the program code based on the specific loops or program modules determined to be executed by the monitored system 350.

As shown in FIG. 4, in some embodiments, the analyzer 430 can include an analyzer processor (or feature extractor) 432 that performs deeper analysis model-driven feature extraction of the program and hardware characteristics (obtained, for example, during training) to continuously maintain a software model 434 of the software state and hardware/software (HW/SW) interactions model 436. For example, the model of the software state 434 can keep track of the probable/likely recent path through the program, and identifies the possible/likely next-step execution, which allows the feature extraction and matching algorithm to limit its search space to only those that are possible, and the matching is performed in order of likelihood. The model of HW/SW interactions model 436 allows the matching algorithms to recognize and account for significant events, such as cache misses and branch mispredictions, that can significantly change the timing and signal shape. The analyzer processor 432 can also report anomalies to the anomaly reporter 450 and can forward statistics of seemingly normal and mildly-anomalous signal-to-execution matches to the multi-observation verifier 440. In some embodiments, the analyzer 430 can perform deeper analysis on portions of the signal identified as potentially anomalous by the monitor 420. Likewise, in some embodiments, the analyzer 430 can perform deeper analysis on portions of the signal that have not been matched to portions of code by the monitor 420.

According to some embodiments, the verifier 440 can maintain statistics across multiple dynamic occurrences for each point in the code executed by the monitored system and can verify that these statistics match expectations, such expectations based on previous analysis of the monitored system executing the various code and the resultant emanations. The verifier 440 can then be able to detect small-but-persistent deviations from expected behavior of the monitored system. For example, if a statistic fails to match expectations, the verifier 440 can be able to detect that a single instruction in the program has been replaced with a very similar one and can report such deviations to the anomaly reporter 450.

The anomaly reporter 450 can report anomalies based on information received from the monitor 420, the analyzer 430, and the verifier 440. In some instances, the anomaly reporter 450 can send a notification of an anomaly. In some cases, the anomaly reporter 450 can identify a portion of code in which the anomaly occurred. In some embodiments, the anomaly reporter 450 can be configured to shut down the monitored system in response to detecting an anomaly. For example, if the monitored system is a nuclear power plant controller, the anomaly reporter 450 can trigger a safe shutdown of the nuclear reactor in the event of an anomaly detection.

In some cases, the monitor 420 performs an initial signal analysis to efficiently identify portions of the signal corresponding to loops and other repetitive activities being performed by the monitored device 350. The analyzer 430 can perform a deeper, secondary signal analysis on portions of the signal not identified by the monitor 420 (i.e., the portions of the signal that were not identified as corresponding to loops or other repetitive activities) to correspond the signal to other code portions executed by the monitored device

350. In some cases, the verifier 440 can perform statistical analysis on the identified code portions.

In some embodiments, the monitoring system 300 can exclude portions of one or more of the analyzer 430 and the verifier 440. In other words, in some cases, the monitoring system 300 can perform the initial (i.e., efficient) analysis to identify loops and other repetitive activities in the signals emanated by the monitored system 350, without performing one or both of the deeper analysis of the analyzer 430 or the statistical analysis of the verifier 440.

In some embodiments, the monitoring system 300 can exclude portions of the monitor 420 and the verifier 440. In other words, in some cases, the monitoring system 300 can perform the deeper analysis to match the signals emanated by the monitored system 350 to code portions by the analyzer 430, without performing one or both of the initial analysis of the monitor 420 or the statistical analysis of the verifier 440.

Example Sensor

According to some embodiments, the sensor 410 can include a spectrum analyzer that can sample a spectrum of electromagnetic emanations and record a real-time signal from one or more frequency ranges. For example, the Agilent MXA N9020A, 0-26 GHz has a real-time acquisition mode that records the real-time signal from any one 85 MHz-wide frequency band from the 0-26 GHz frequency range. In some cases, the real-time bandwidth can be 150 MHz. The spectrum analyzer can have dynamic range that allows measurements of very weak signals not observable on some oscilloscopes.

In some embodiments, the sensor 410 can include oscilloscopes with improved dynamic ranges that can measure very weak signals. For example, the Keysight DSOS804A can be included in the sensor 410 and can be capable of capturing signals across an entire spectrum to simultaneously record multiple signals (e.g., memory and processor clock) and/or to record several harmonics of a single signal. By measuring very weak signals, the monitoring system 300 can potentially observe anomalies that are not otherwise observable or identifiable.

The sensor 410 can include one or more antennas and magnetic probes. In some examples, measurements can be performed with three different types of antennas. Different types of antennas can detect signals from various frequencies, produced by different types of devices under test (e.g., monitored system 350), and from different distances at which measurements need to be performed. In selecting or designing an antenna for the sensor 410, four variables can be considered: near-field vs. far-field antennas, and narrow-band vs. wide-band antennas. Near-field antennas, such as magnetic probes, can be used for detecting frequencies up to 100 MHz because the antennas will be in the near field even when they are 10 feet away from the monitored device. On the other hand, far-field antennas can be used for detecting higher frequencies. Examples of far-field antennas include helical, horn, and log-periodic antennas, which can be useful because of their high-gain, directional radiation patterns and relatively compact size. In addition, antenna gain can be further enhanced by careful design of matching circuits. However, matching circuits can limit bandwidth. Antenna selection and design can differ depending on the design of the monitored device 350. For example, certain monitored devices 350 can have limited functionality, such as some IoT devices or embedded systems. Thus, the monitoring system 300 can require less bandwidth to accurately monitor certain monitored systems 350. As another example, antenna selection can be based on the frequencies of emanations from the monitored system 350. For example, some devices can have lower frequencies of emanations, and antennas tuned to lower frequencies can be needed. In some cases, a monitored system 350 can emit signals at both high and low frequencies from different portions of the monitored system 350, and, therefore, different antennas capable of detecting both frequency ranges can be selected.

In some embodiments, the sensor 410 can include a phased array of coils, for example, similar to those used for magnetic resonance spectroscopy. The distance and resolution can be enhanced by carefully choosing a number of magnetic coils and a spacing of the magnetic coils. The sensor 410 can include helical antennas as far-field antennas. In some cases, helical antennas can have up to 18 dBi gain, and, by collocating helical antennas in a quad, the gain of an antenna can be enhanced 2-4 times. Helical antennas can support both narrow- and wide-band designs, which can provide increased flexibility in selecting multiple sub-channels at the same time.

The sensor 410 can also include a portable acquisition system with high precision A/D converters. In some embodiments, the high precision A/D converter can be of a same type as that used for side channel crypto analysis. A portable acquisition system can allow integration of antenna arrays and software algorithms with a continuous real-time acquisition system. In some cases, spectrum analyzers and oscilloscopes can provide for precise and calibrated signal acquisition and can include powerful tools for signal analysis and visualization. As will be appreciated, a portable acquisition system can allow for continuous acquisition and analysis but may not include built-in analysis and visualization capabilities of measurement instruments.

Sensors 410 can be selected based on aspects of the monitored system 350 (e.g., frequencies of emanations from the monitored system 350) and requirements of the monitoring system 300. For example, a monitored system 350 can emanate signals at certain frequencies in certain bandwidths; sensors 410 sensitive to the frequencies and bandwidths of the emanated signals can be selected for use in the monitoring system 300. In some cases, greater bandwidths can allow greater precision in determining a status of the monitored system 350. In some instances, greater bandwidth requires additional processing power to process emanations from the monitored system 350 and storage capacity to store the processed emanations. Thus, in some cases, there can be a tradeoff between precision and power consumption or cost of the monitoring system 300.

System Training

In some cases, monitored system hardware characterization, by the monitoring system, can be useful in order for the monitoring system to determine, for example, where in spectrum the strongest emanations from the monitored system occur, how to position the sensor 410 relative to the monitored system to get the strongest signal, and where in spectrum other signals can interfere with the emanations observed from the monitored system. In some embodiments, a software model 434 can employ a FASE (Finding Amplitude-modulated Side channel Emanations) method (or an extended FASE method) to find all unintentional carriers, and to determine which activity modulates them and how strongly. By observing the spectrum around the carriers, the system can determine the available bandwidth around a carrier signal (i.e., a bandwidth without other interferers). The available bandwidth around the carrier signal can be used to govern a selection of frequencies to be observed and antennas to be used in the sensor 410 to collect the signal. Additional details of an example are disclosed in "FASE:

Finding Amplitude-modulated Side channel Emanations" by R. Callan, A. Zajic, and M. Prvulovic in 42*nd International Symposium on Computer Architecture (ISCA)*, 2015, the disclosure of which is incorporated by reference herein in its entirety.

In some cases, the disclosed system can perform localization to determine optimal or preferred positions for antennas of the sensor 410 to get an improved signal from the monitored system. Localization can be performed during a training of the monitoring system 300. In some embodiments, the disclosed system can perform localization by scanning across a processor board of the monitored system while the monitored system is running code. In some instances, however, scanning across the processor board can need to be further supplemented as it may not detect that different code can cause emissions from different parts of the monitored system, and the signals recorded while scanning across the board then may not relate to software activity.

Accordingly, in some implementations, the disclosed systems and methods can employ localization that uses an approach that leads to better understanding of the relationship between the monitored system's software and locations where the strongest emanations from the monitored system occur. For example, the disclose systems and methods can use a "SAVAT" method, as described, for example, in "A Practical Methodology for Measuring the Side channel Signal Available to the Attacker of Instruction-Level Events," by R. Callan, A. Zajic, and M. Prvulovic in *Proceeding of the* 47*th International Symposium of Microarchitecture* (*MICRO*), 2014 (the disclosure of which is incorporated by reference herein in its entirety) to develop a controlled benchmark by alternating between two instructions and then monitoring the resultant emanations. Then, the disclosed system can apply the scanning across the monitored system with a small sniffer, which can lead to additional information and pertinent results, as will be appreciated.

According to some embodiments, a 2-D plotter can be modified to attach an EM probe and can be used to scan the monitored system and collect various measurements around the monitored system 350. In some cases, the number of measurements collected can be based on complexity of the monitored system 350. Information collected by the EM probe can then be evaluated by certain algorithms to find the location and magnetic moment orientation of the monitored system's signal source. Such techniques can allow for identification of several locations of interest on the monitored system's board with respect to program instructions. As will be appreciated, the source of emanations when processor-memory activity is present can be different from the source of emanations when two arithmetic logic unit (ALU) instructions are alternated by the monitored system. Accordingly, localization can help determine optimal sensor 410 locations, e.g., antenna positions, for the better signal reception.

In addition to localization, the disclosed systems can use channel characterization to select which sub-channels of the monitored system will be used for monitoring. For example, it can be useful to determine the propagation mechanisms that govern EM emanations from monitored systems. One challenge with external monitoring is that emanations can occur over a large range. For example, typical signal carriers can include, for example, voltage regulators with relatively low frequencies (e.g., <1 MHz) and processors and memory clocks with relatively high frequencies (e.g., from 50 MHz (FPGA) and exceeding 3 GHz (personal computer processors)). As will be appreciated, the large range means that some useful emanations will be strictly in a near-field, which decay quickly, or in the far-field, which can propagate many feet away. In addition, the physical structure of the monitored system (e.g., metal and plastic parts objects covering the system) can interfere with the emitted signals and can even cause multipath propagation.

Accordingly, as a non-limiting example, the disclosed system can use SAVAT benchmarks as a signal generator to collect channel impulse responses, analyze properties of the channel, and develop statistical channel models that can help predict propagation behavior of unknown devices (black boxes). In some embodiments, the disclosed system can make measurements of multiple identical devices running the same, similar, and completely different codes to characterize noise and interference levels that will help to estimate how far apart similar devices need to be positioned to minimize interference of software monitoring.

In some embodiments, the disclosed system can use multiple-input and multiple-output (MIMO) channel characterization so that a single device can monitor software activities of multiple devices. In this case, signals from multiple devices with same, similar, or different hardware performing the same, similar, or different software activities will be recorded by one monitoring system with multiple antennas. Statistical propagation models can be used to help predict propagation behavior of unknown devices (black boxes). These models can be used to account for propagation effects of EM emanations, and for channel equalization.

Figure 5:
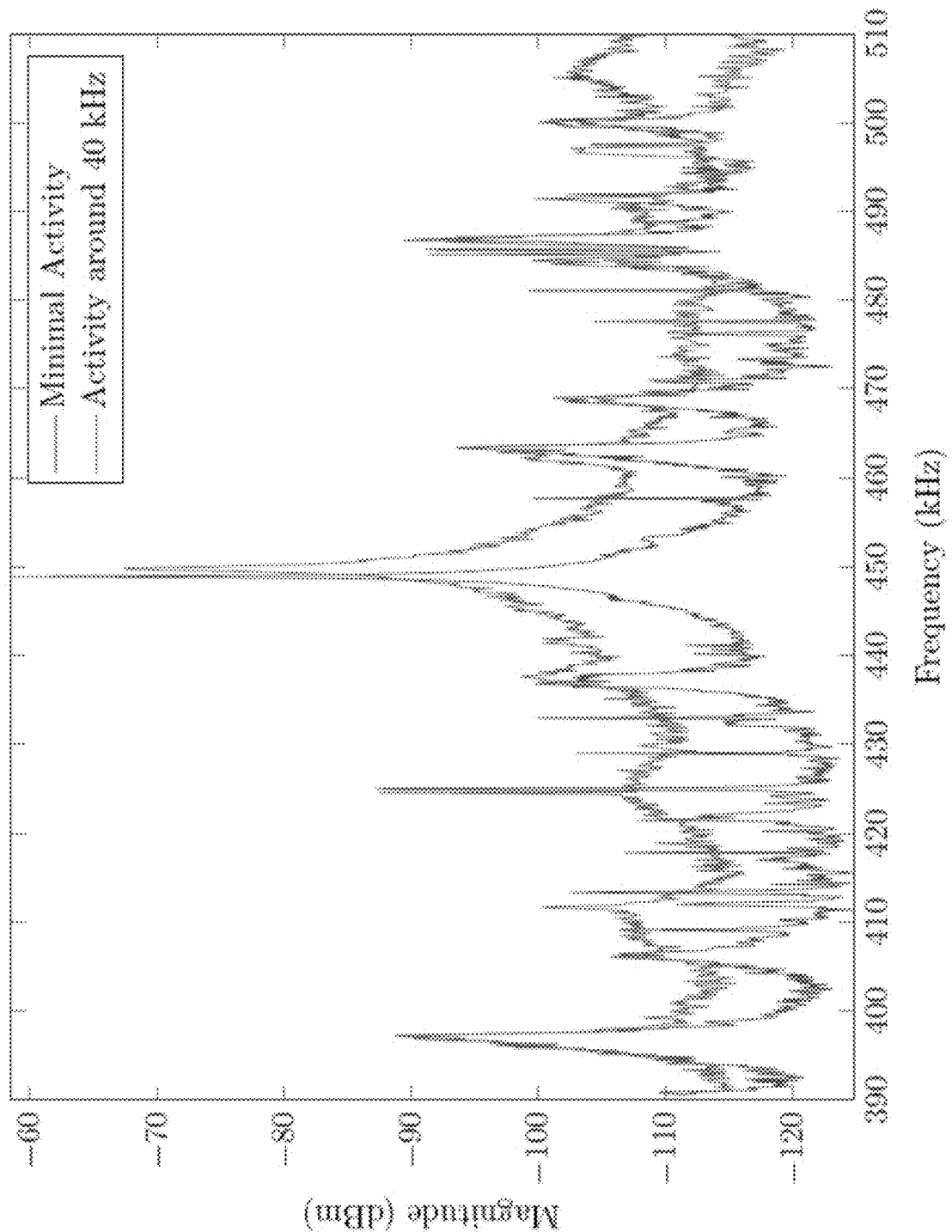
FIG. 5 illustrates an example modulated carrier signal overlaid on an unmodulated signal.

Another aspect of system training can include interference mitigation. Potential permanent interferers within the sub-channels of interest of monitored devices can be identified and, in some cases, the permanent interferers can be removed or minimized. In some cases, the permanent interferers can be mitigated by filtering the sub-channels of interest. In some cases, the permanent interferers can be removed or mitigated by modifying the monitored devices. Although unlikely, in some specialized cases, a sub-carrier that has no interference across a large enough bandwidth could be used. However, in many cases, no suitable sub-carrier can be available. For example, processor and memory sub-carriers can operate at around a 1 GHz frequency, where other devices such as cellphones commonly operate. Meanwhile, at lower frequencies, voltage-regulators of the monitored device have prominent spectral features and can interfere with desired signal. As a non-limiting example, FIG. 5 illustrates a modulated carrier at 450 kHz with minimal activity and modulation, overlaid with a base-band signal having 10 kHz of bandwidth and some activity that has frequency content around 40 kHz. In the both sidebands, significant interference (e.g., several peaks interfering in the broad side-band) can prevent correct demodulation of signals.

In some embodiments, for unified consideration of accuracy, fidelity, distance, timeliness (e.g., how many instances of an anomaly are needed to report it at a given level of confidence), how much shaping/boosting can be needed, etc., an information-theoretic model for their inter-relationship, and use information-theoretic bounds derived from that model can be used to assess actual results in terms of closeness to these bounds. For example, the model-derived upper bound for accuracy of detecting a single-instruction difference in program execution, using the measured signal-to-noise ratio at 10 ft close proximity, might be 90% after observing only a single dynamic instance, and 95% after observing five dynamic instances. If, for example, the monitoring system actually needs 10 dynamic instances for 95% accuracy, it means that it is within a factor of 2 from what might ideally be possible according to the model. Of course, the model itself does not capture all of the constraints, so the factor-of-2 finding in this example indicates that either the model can be refined to account for additional constraints (thus increasing the lower bound for the number of dynamic instances) or the actual implementation can be improved to get closer to the model-derived bound. In some cases, a sufficiently-refined model can be needed to identify where software shaping or hardware signal boosting is needed to achieve the desired verification fidelity, accuracy, and timeliness, and how to shape the software or apply signal jamming techniques to deny opportunities for side channel attacks (e.g. information about sensitive data values) while retaining the capability to perform verification.

In some cases, a model employed by the disclosed system can combine 1) the Shannon limits (i.e., the theoretical maximum information transfer rate of a channel for a particular noise level) to identify how much information is potentially present in an emanated signal with a given signal-to-noise ratio and bandwidth, 2) the amount of information that is required to compensate for uncertainty in software execution (e.g., a dynamic instance of an unbiased if-then-else-hammock requires CAMELIA to extract one piece of information from the signal, i.e., which of the two paths is actually followed), 3) the amount of information that is required to compensate for uncertainty about hardware and system interaction events (e.g., to remove uncertainty about whether, for example, interrupts have occurred and accesses have missed in a cache), and 4) how much information is needed to perform the verification at the desired level of fidelity. Such a model can be refined to account for additional limitations. For example, since involuntary emanations do not efficiently utilize bandwidth and signal power, the information content of these emanations can be much lower than optimally predicted.

In addition, the training can include spectral profile training to identify regions of code executed by a training system that are often executed by the monitored system 350. The training system can be the same or similar to monitored system 350. The spectral profile training can leverage emanation from the training system to profile software loops and other repetitive activity performed by the training system. In some cases, repetitive activities cause emanations, such as electro-magnetic signals, to exhibit periodicity, i.e., the emanations have spikes (e.g., energy concentrations in the spectrum that contain at least 1% of the total energy of the spectrum) at frequencies corresponding to time spent in each repetition of the activity. In some cases, transitions between different software portions (e.g., loop-to-loop transitions) can exhibit spectral features unique to the transition. For example, spectral features of a transition can include features from both the preceding code execution and the following code execution.

Spectral profile training can be performed in two stages. First, instrumentation can be used to measure an average execution time for code over multiple iterations, e.g., an average per-iteration execution time for a code loop. In some cases, this instrumentation can be embodied as code modifications executed by the training system, said code modifications recording start and end times of program modules. This average execution time can be used to estimate a frequency of at which a spectrum corresponding to executed code should be observed. A plurality of frequencies of different code portions can be combined into a histogram of frequencies that can be used for comparison in the second training stage.

In the second training stage the training system can be monitored without any instrumentation or profiling-related activity on the profiled device in order to prevent distortion of the corresponding spectrum. During this stage, the frequencies detected in the first stage are used to identify spectrum (e.g., emanations) that correspond to various code portions. The spectrum can then be processed to identify "spectral signatures" corresponding to various code segments. The spectrum can contain spikes corresponding to both per-iteration execution times (e.g., fundamental frequencies) and spikes at multiples (e.g., harmonics) of the frequencies, which can help to further differentiate spectra corresponding to different loops. The spectral signatures can be used to identify code segments executed by the monitored system.

In some cases, the training can include a zero-overhead profiling (ZOP) approach to profile the spectral emanations of a monitored system. During a first training phase of the ZOP approach, an instrumenter can analyze code to be executed by the training system to identify acyclic paths in the code. For each identified path, the code can be modified to include a marker, for example, by inserting a program call to uniquely identify the marker. The training system can then run the modified code. Spectral emissions of the system can be monitored with markers indicating which points in the code correspond to the various spectral emissions. These spectral emissions can be analyzed for comparison during a second training phase of the ZOP approach.

In addition, during the first training phase of the ZOP approach, the instrumenter module can generate a marker graph that models possible paths between the marker code locations. In other words, the instrumenter module can analyze the code to determine possible execution orders of the code. In sine cases, the marker graph can be developed by analyzing the order of marker invocation during the execution of the modified code.

During a second phase of the ZOP approach, emanations from a training system during execution of the unmodified code are monitored. These emanations are compared to the emanations recorded during the first phase of the ZOP approach and, together with timing information from the first phase, are used to match code segments to particular emanations. To make this comparison, various techniques can be used, for example, time warping between the two sets of signals. The timing information and emanation comparison can be used, for example, in path prediction during signal processing, as discussed below. In some cases, this comparison can be made by the monitor 420, either alone or in combination with other components.

In some cases, the emanations from the training system can be converted into a sequence of overlapping windows using a short-term Fourier transform. The sequence of overlapping windows can then be converted into a spectrum, which can be analyzed to determine spectrum characteristics for the execution of various code portions (e.g., loops and loop-to-loop transitions).

Example Monitor

In some embodiments, the monitor 420 can be configured to quickly identify a significant departure from expected behavior by performing continuous verification with at least loop/module fidelity. In some cases, the monitor 420 can include the monitor processor 422, the separator 424, the spectral monitor 426, and the buffer 428. The monitor processor 422 can perform, for example, identification of what directions the signals are coming from, beam forming, and interference cancellation to enhance the signals from the monitored device while suppressing other signals based on the training models. The separator 424 can separate the enhanced signals into sub-channels and transmit the sub-channels to the spectral monitor 426 and the buffer 428. The buffer 428 can use real-time buffering of the signals in order to perform deeper analysis should the spectral monitor 426 detect potential anomalies.

In some cases, the monitor processor 422 can convert the emanations from the monitored system 350 into a sequence of overlapping windows using a short-term Fourier transform. The monitor processor 422 can then convert the sequence of overlapping windows can into a spectrum, which can be compared by the spectral monitor 426 to expected spectrum (e.g., those gathered during training) to predict currently executed code portions. In some cases, the spectral monitor 426 can detect anomalies based on, for example, unlikely observed code sequences.

In some embodiments, the spectral monitor 426 can rely on a coarse-grain (loop/module level) model of the monitored system's software to identify large deviations from the program's behavior (e.g., when certain executions are detected that should not be possible after certain functions). The spectral monitor 426 can use typical spectra (e.g., spectra acquired during training) to identify deviations. For example, in some embodiments, the spectral monitor 426 can detect when an observed behavior of a time-per-iteration of a loop should be very consistent but varies widely. Spectral monitor 426 can report identified major anomalies to the analyzer 430 for deeper analysis.

Figure 6:
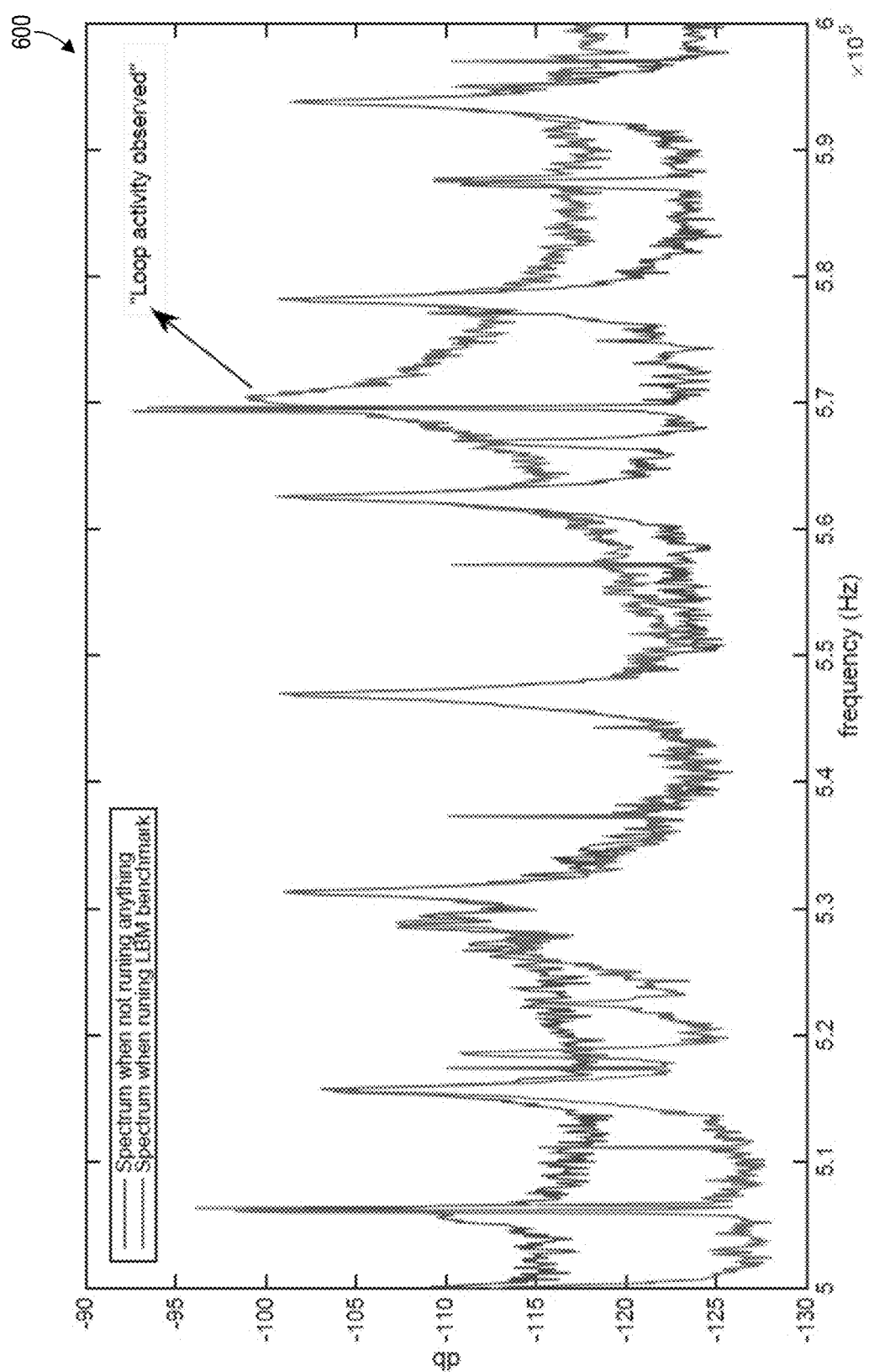
FIG. 6 illustrates spectral features identified by a spectral monitor according to an example embodiment.

For example, referring to FIG. 6, spectral monitor 426 can identify spectral features that correspond to execution of loops and match the amplitude and shape of such spectral features to expected behavior (e.g., features observed during training). For example, the spectral monitor 426 can compare the spectral features to spectral fingerprints of code executions derived from, for example, the spectral monitoring training described above. In some cases, unmatched spectral features can be attributable to unmatched portions of code by utilizing a model of possible loop-level sequences (e.g., the software model 434) to identify such "mystery spectra." In some embodiments, the spectral monitor can reconstruct an execution path of the program code by the monitored system 350 based on the identified loop or program module. The reconstructed execution path can have various uses such as, as non-limiting examples, during root cause analysis when repairing a software defect or forensic analysis when analyzing the behavior of malicious software.

During a training phase, logged clock cycle counts (or time stamps) that correspond to the beginning and the end of a loop/loop nest/module can be used to estimate the frequency at which the monitored system's program activity should appear. Then, during the monitoring phase, the disclosed system can monitor the recorded spectrum for changes in existing program activities (e.g., frequency shift or amplitude change in the spectrum) or appearance of new program activities (e.g., new frequency spikes).

Accordingly, the spectral monitor 426 may, in real time or near-real time, identify problems, such as security problems, by, for example, recognizing execution of unknown loops, changes in the timing or the distribution of timings of loop iterations.

In some cases, the spectral monitor 426 can provide additional verification capability that can be obtained by also performing rapid analyses on the time-domain signal. In some case, only the most prominent aspects of the time-domain signal are matched. However, the most prominent aspects of the time-domain signal typically include, for example, app-OS transitions, switching between applications, and transitions between program phases within an application.

The spectral monitor 426 can also guide the selection of signals for more detailed analysis by the analyzer 430. While spectral monitor 426 can sacrifice fidelity to achieve greater discovery of larger anomalies, the analyzer 430 can focus on increased fidelity but may not typically cover all of the signal (for example, due to time/power constraints). However, if the analyzer 430 performed detailed analysis on new samples as the previous analysis was completed, the same code can be repeatedly analyzed (e.g., in a hot loop), while code that executes less often can be rarely analyzed. Accordingly, the system 300 can select signals for detailed analysis strategically, using, for example, suspiciousness (e.g., based on identifications of the spectral monitor 426), a fidelity estimate, and recency of coverage as selection criteria. Parts of a signal can be assigned priority levels for deeper analysis based on, for example, the signal's deviation from an expected norm and with time since the corresponding loop/module/function has undergone deeper analysis.

Accordingly, in some embodiments, the spectral monitor 426 can immediately report anomalies detected with a high confidence, refer lower-confidence potential anomalies for deeper analysis by the analyzer 430, and distribute the deeper analysis effort in a way that avoids leaving less-often-executed code without scrutiny for extensive periods of time.

Example SW Model

The SW model 434 can allow the analyzer 430 to account for, and use for verification, knowledge about the expected behavior of the monitored system's software, including the firmware, system software, and applications. The SW model 434 can be a probabilistic model and can include a CFG at basic block granularity, instruction-level representation of a program, and intermediate-representation of the program. This CFG can be derived from static analysis of the code, along with information that can be obtained from dynamic analyses (training runs) on the system. The CFG can include edge probabilities (for example, derived through the training), data locality metrics for memory access instructions, and statistics for monitored systems. From this detailed model, the system 400 can derive a module/loop-level model that can be used for coarse-grained verification by the spectral monitor 426 during spectral monitoring, for example, to identify module/loop transitions that should not be possible in that application.

The analyzer 430 can improve matching performance using the CFG and its edge probabilities by attempting the matches in order of likelihood. For example, consider an if-then-else hammock where the "then" path can be much more likely that the "else" path, and a signal-matching state where the most likely hypothesis is that the program is about to enter that hammock, and alternative lower-probability hypotheses place execution elsewhere in the application. The SW model can identify that the most likely program path is through the "then' path, so the signal matcher first attempts to match the continuation of the signal to the signal that corresponds to the "then" path through the hammock. If that is a high-probability match, some (or even all) alternative hypotheses can be rejected, which can dramatically reduce the search space for matching.

Additional information in the SW model 434 can be used to verify memory access patterns, system calls, and other interactions between the monitored system's application and the hardware. For example, semantic information about a system call site can include the type of the system call and statistics for its parameters, which allows verification to check not only that the correct system-call code is executed in the operating/runtime system, but also to check whether the path through the system call is appropriate for the parameters that this particular system-call site provides. Similar calling-context-sensitivity refinement can be used for function and method calls whose CFG edge probabilities depend on the calling context.

The probabilistic software behavior model 434 can dramatically reduce the search space for its model-driven signal matching and can allow the analyzer processor 432 to account for execution variations that are part of the expected program behavior, while detecting similar-magnitude deviations.

Example HW/SW Interaction Model

In some embodiments, the HW/SW interactions model 436 allows the matching analyzer 430 to recognize and account for significant events at the monitored system, such as cache misses and branch mispredictions, that can significantly change the timing and signal shape. Accordingly, the HW/SW interaction model 436 can reduce the need to obtain training data for all possible combinations of hardware events that can possibly, but will not necessarily, occur in a particular part of the code. The hardware interaction model is also informed by the SW model 434 (e.g., it allows a cache-miss-like part of the signal to be matched as a cache miss only if the program contains a memory access at that point in execution), and the verifier 440 can monitor the occurrences of such events against expectations of detected anomalies (e.g., many cache misses in a part of the code where cache misses should be rare.)

In some cases, the HW/SW interactions model 436 can allow the analyzer 430 to account for, and use for verification, those hardware/software interactions that can significantly affect the timing and/or shape of the emitted signals. According to some embodiments, the model 436 can only include those aspects of software-hardware interaction that have the largest impact on observed signals, i.e., those events that, if not accounted for, would act as the biggest obstacle to accurate matching.

For example, in some cases, the HW/SW interaction model 436 can be used to predict interrupt and some input/output (I/O) activity of the monitored system. From a signal-matching perspective, an interrupt splices the interrupt handler execution signal into the signal that corresponds to normal execution of the monitored program. The interrupt also causes disruption of the processor's pipeline which produces a signal similar to a branch misprediction, and several cache misses can be expected when the interrupt handler begins to execute. In some cases, an occurrence of an interrupt produces signals that are almost identical to what would be observed if a monitored application was modified to branch to unknown code (e.g., misprediction when the branch is taken), perform some action, then jump back to continue the original code. Without accounting for interrupts, the analyzer 430 must either have increased tolerance for interrupt-like anomalies and subsequently fail to detect an entire class of attacks or have an increased occurrence of false positives in response to legitimate interrupts.

In some cases, the HW/SW interaction model 436 can account for interrupts at the monitored system by including an expected sequence of events (and their respective signals) for an occurrence of a particular interrupt, including a model of the interrupt handler code itself, along with a probabilistic model of which interrupts can be expected during which code executions or at what time.

For example, a given monitored system can have a timer interrupt 10,000 times per second, so a signal-to-execution matching hypothesis becomes unlikely-to-be-valid if that hypothesis assumes that a timer interrupt occurs long before or has not occurred long after it is due to occur. Furthermore, the timer interrupt cannot occur in parts of the code where interrupts are disabled and interrupts any interrupts-enabled code without bias. Thus, a signal-to-execution matching in which the timer interrupt happens abnormally at a specific code point becomes unlikely-to-be-valid. Thus, after anomalous interrupts, the analyzer processor 432 can distinguish interrupts from interrupt-like anomalies and improve its monitoring by finding anomalies in interrupt behavior.

The HW/SW interaction model 436 can also model I/O, for example, to account for direct memory access (DMA) transfers between the memory and the device, I/O completion and other interrupts, and system activity related to I/O, without losing the ability to identify anomalies that produce similar-magnitude changes to the signal. The I/O model can include an expected sequence of events in I/O. For example, for disk I/O the model 436 can expect the appropriate system call to occur, the appropriate amount of memory to be transferred to the disk controller, and the completion interrupt to occur after the appropriate amount of time.

The HW/SW interaction model 436 can also model branch mispredictions and cache misses. Even in the simple processors in use today, branch prediction and caching are used to improve performance, and mispredictions and cache misses cause significant changes in execution timing and hardware activity (and the resulting EM signals). For example, a 10-instruction code fragment can execute in 4 cycles without cache misses but can take 100 cycles or more if it experiences a last-level-cache miss. Without accounting for these events, the analyzer 430 either flags each of them as an anomaly (many false positives), or it tolerates relatively large anomalies in execution timing and signal magnitude, and consequently can miss anomalies.

The HW/SW interaction model 436 can include a basic model of branch prediction and cache activity, the expected sequence of events when encountering a branch misprediction or cache miss, and their timing and signals. Similarly, HW/SW interaction model 436 can include a basic model of a cache access sequence (access L1 cache, if miss access L2 cache, etc.), along with their timing and expected signals. Thus, the system 300 can account for occurrences of these events in the monitored system's signal, but only at times when these events can occur (memory access for cache misses, branches for misprediction) and only if the signal matches the reference or, for cache misses, a valid sequence of references (the L1 miss reference signal, possibly followed by the L2 reference signal, etc.). For last-level cache (LLC) misses, the signal sequence can include main-memory access, so the model 436 expects the processor-sub-channel signal to match the LLC-miss reference signal, and also the memory-sub-channel to match the main-memory access reference signal for that sub-channel. The HW/SW interaction model 436 also tracks how often each static instruction misses in the caches, and the pattern of these misses, and verifies the pattern against statistical expectations for that code, which provides detection of many memory access pattern anomalies.

In addition, in some processors, such as high-performance processors, instructions are executed out-of-program-order, and execution of hundreds of instructions can be blended together as the processor seeks to improve performance by overlapping and reordering execution of many instructions. From the monitoring system's 300 point of view, this means that the same static instructions can produce different signals depending on which instructions appear on the program-order execution path before and after them. A brute-force solution to obtain signal training data for every possible hundreds-of-instructions-long dynamic path would produce thousands of reference signal versions for each code point and create significant training-input-generation challenges. Accordingly, in some cases, the system 300 can only generate one or a few reference signals, which correspond to the most frequently encountered signal(s) from training. The SW/HW interaction model 436 can be used to identify which instructions are likely to significantly change their timing depending on other instructions in the program. In some cases, the significant changes are a result of data dependencies that involve long-latency instructions (such as LCC misses). Using the SW/HW interaction model 436, the system 300 can infer the signal changes created by such event-induced reordering, and to produce a close approximation of the missing reference signal.

In some cases, the SW/HW interaction model 436 is a parametrizable general model. In other words, different hardware architectures and implementations can be expected to have different parameters but conform to the same overall model. This is because most processors manufactured today use the same "bag of tricks" for performance enhancement. Accordingly, the SW/HW interaction model 436 or portions thereof can be used for various hardware architectures.

Example Signal Processing

Figure 7:
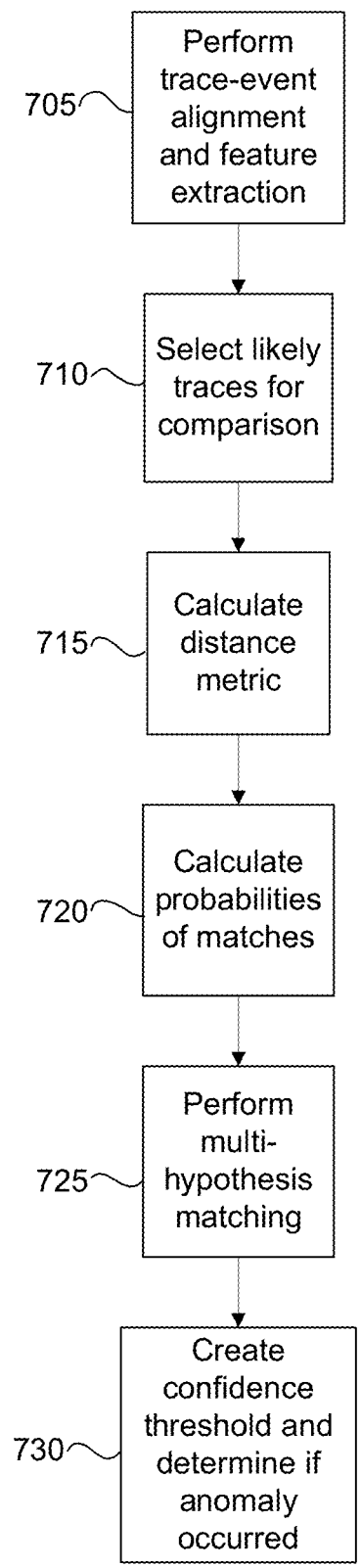
FIG. 7 is a flowchart of signal processing according to an example embodiment.

The monitoring system 300 can perform a signal processing approach that relies on guidance provided by software and hardware models to reduce the search space and perform multi-hypothesis testing with a trellis search rather than relying on hard-decision detectors. FIG. 7 illustrates a signal processing approach according to an example embodiment.

Referring to FIG. 7, trace-event alignment is performed 705, for example, by the analyzer processor 432 to account for recognized events (e.g., interrupts and cache misses) that effectively splice-and-blend relatively strong and long-duration event-related signals into the trace. Time-warping may not sufficiently handle such long-duration signal insertions well, and thus the HW/SW interaction model 436 can be used to identify which event signals are likely to have been spliced into the observed signal, and composing the corresponding reference traces whose length matches the observed signal. The insertion may not be perfect, and in the places where a signal is inserted, discontinuities can be present. In some cases, time warping or machine learning can be applied to discontinuities to distinguish normal from abnormal transitions. In addition, the analyzer processor 432 may, as needed, perform 705 feature extraction on both training and observed traces.

The analyzer processor 432 can select 710 likely traces for comparison with an observed trace. This reduces the search space from every recorded trace to the most likely traces for comparison. The selection 710 can be performed based on the SW model 434 and the HW/SW probabilistic model 436. In some cases, the selection 710 is performed iteratively by selecting a trace length corresponding to multiple basic blocks of the program.

The analyzer processor 432 can then calculate 715 a distance metric between the selected traces and the observed trace. In some cases, the traces are compared in order of likelihood based on the CFG edge probabilities of the SW model 434. In some cases, the calculated distance metrics can serve as a starting point of a trellis in multi-hypothesis matching.

The analyzer processor 432 can calculate 720 probabilistic matches using the SW model 434 and the HW/SW interaction model 436 to determine the likelihood that certain events can follow the others. The likelihood of a match for each candidate is then computed 720 by comparing the computed distance metric against the distribution of expected distance given the noise, unaccounted-for hardware events, etc.

The probabilities of each match are combined with probabilities from the models 434 and 436 and used for multi-hypothesis matching 725, which updates its set of execution sequence hypotheses. The multi-hypothesis matching 725 produces new probabilities for the block execution. Using this Viterbi-like matching approach, incorrect hypotheses suffer rapidly declining likelihood. Low-likelihood hypotheses can be pruned from the probabilistic tree so that a candidate-hypothesis set stays manageable in size.

Based on the multi-hypothesis matching 725, the analyzer processor 432 creates 730 a confidence threshold and decides whether an anomaly has occurred.

As an example, based on the SW model 434, only basic blocks D and G can be selected 710 as likely traces after the basic block sequence A→B→C. Thus, distance metric is computed 715 only between the observed signal and the trace references for D and G. The likelihood of a match for each candidate is then computed 720 by comparing the computed distance metric against the distribution of expected distance given the noise, unaccounted-for hardware events, etc. The probabilities of each match are combined with probabilities from the models 434 and 436 and used to perform 725 multi-hypothesis matching, which updates its set of execution sequence hypotheses. In this example, the hypothesis A→B→C is replaced with hypotheses A→B→C→D and A→B→C→G, each with its own probability. The matching process can then be repeated for a next block based on the basic block sequences A→B→C→D and A→B→C→G. If the confidence that one of A→B→C→D and A→B→C→G has been detected, the other one can be dropped for a next matching process.

In some embodiments, this model-driven approach can be adapted to "learn" missing reference signals automatically. For example, if no training trace exists for a valid program path, the multi-hypothesis matching 725 can still form hypotheses that include this path when permitted by the SW model 434. When this hypothesis becomes the most likely hypothesis, the analyzer processor 432 can form a new reference signal trace, verify that all instances provisionally matched to this path are matches for it, and continue with an expanded reference signal set. In some embodiments, it can be possible to learn most or all reference traces using this approach.

Example Verifier

Under poor signal-to-noise conditions, which in some cases are likely to exist (e.g., in loft distance monitoring of low-power devices), low-magnitude anomalies may not be accurately detected and reported by the monitor 420 and the analyzer 430. For example, a single-instruction modification of a program may not be detected with high-enough confidence. This is because the anomaly-induced signal change can be weaker than noise. To address this problem, the verifier 440 can collect statistics over multiple instances of signal detection that are matched to the same code (and sequence of hardware interaction events). The verifier 440 can analyze the statistics to determine whether an anomaly has occurred. Although detection in these cases will not be instant because multiple instances of the potential anomaly must be observed, the verifier can improve fidelity and/or reporting confidence for small anomalies or in high-noise environments.

For example, the verifier 440 can determine whether an execution time of a particular code portion on the monitored system 350, as determined over several runs, is attributable to natural variation or an anomaly through statistical analysis. As another example, the verifier 440 can track a number of interrupts or cache misses during execution of a particular code portion on the monitored system 350, as detected over several runs, and determine whether the frequency of interrupts or misses is outside of an expected range (e.g., whether the interrupts and misses can be attributed to valid program execution). As another example, the verifier 440 can track a time spent executing detected interrupts or cache misses during execution of code on the monitored system 350, and determine whether the time spent executing interrupts or misses is outside of an expected range (e.g., whether the interrupts and misses can be attributed to valid program execution).

As a non-limiting example, an anomaly that causes a small but systematic change in signal value can be distinguished from noise by averaging over multiple instances. By averaging over N instances, the white Gaussian noise in the averaged signal is suppressed by a factor of $\sqrt{N}$, where N is chosen to achieve the desired signal-to-noise ratio. In practice, N can be limited by the noise not being distributed in a perfectly Gaussian way and not being perfectly random (i.e., an "SNR Wall"). In some cases, some of the non-randomness of the noise can be modeled, tracked, and compensated for (for example, signal changes due to temperature variation).

In some cases, the monitoring system 300 can use a two-sample variant of the *Kolmogorov-Smirnov* (K-S) test to distinguish changes in the signal value from natural variation. The monitoring system 300 can determine the likelihood that two groups of spectral samples were randomly drawn from a same population without assuming a nature of the distribution (e.g., Gaussian, Poisson, etc.) using, for example, the K-S test. One of knowledge would understand how to implement a K-S test.

As a non-limiting example, the monitoring system 300 can use runtime program monitoring to detect various malicious activities, such as control-flow hijacking, Mirai malware attacks, and crypto viral attacks. A control-flow hijacking attack changes a program counter to redirect control to either injected code or chosen existing code. This attack can be accomplished, for example, through exploitation of a stack buffer overflow vulnerability. In a control flow attack, the monitoring system 300 can detect significant variation caused in code execution or loop-to-loop transition times and spectrum to identify the control-flow hijacking. Mirai malware attacks compromise computer systems and use the compromised computer system to launch distributed denial of service (DDoS) attacks on third party systems. Mirai attacks gain access to a system by successfully guessing correct login credentials. Accordingly, in some cases, it may not be possible to identify Mirai intrusion as an anomaly. However, the monitoring system 300 can detect identify significant variation in code execution times and spectrum when the monitored system 350 is used to execute a DDoS attack, and thus detect the Mirai attack. Crypto viral attacks encrypt data and demands payment for decryption. However, since encryption is often repetitive, the encryption will create its own loop-type spectral signature which will not correspond to expected emanations from the monitored system 350, and the monitoring system 300 can identify the spectral signature of the encryption to detect the crypto viral attack. Accordingly, the monitoring system 300 can compare emanations from the monitored system when subject to these various malicious activities to determine anomalies and detect the malicious activities.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions can be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Embodiments of the disclosed technology can provide for a computer program product, including a computer-usable medium having a computer-readable program code or program instructions embodied therein, said computer-readable program code adapted to be executed to implement one or more functions specified in the flow diagram block or blocks. The computer program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims and can include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   wirelessly receiving a signal emanating from a monitored device, the signal reflective of actual computational activities of the monitored device;
   determining a probability that the monitored device is compromised by evaluating variance between predicted computational activities from a sequence model of the monitored device, which predicted computational activities are reflective of processing activities of the monitored device that are uncompromised, to the actual computational activities, which provides a probability that an anomalous event exists within the actual computational activities of the monitored device; and
   transmitting data indicative of the probability that an anomalous event exists;
   wherein the sequence model:
      tracks at least a first state and a second state of the monitored device; and
      considers:
         whether the received signal is likely to be produced by the first state or the second state; and
         whether the second state is allowed to follow the first state of the monitored device; and
   wherein if the probability that an anomalous event evidences an actual anomalous event, the data indicative of the actual anomalous event comprises:
      when the anomalous event occurred; and
      in which part of the actual computational activities the anomalous event occurred.

2. The method of claim 1 further comprising:
   sequence modeling the predicted computational activities with the sequence model, wherein the predicted computational activities comprise sequences of hardware/software interaction events, wherein the sequence model comprises a probabilistic software model that is representative of an expected normal execution of a software program running on the monitored device, and wherein the probabilistic software model accounts:
      for all possible expected normal sequences of hardware/software interaction events; and
      how likely each of the possible expected normal sequences of hardware/software interaction events is for the software program running on the monitored device; and
   processing the signal reflective of the actual computational activities, wherein the actual computational activities comprise actual execution of the software program running on the monitored device, wherein the processing is based upon:
      the possible expected normal sequences of hardware/software interaction events of the expected normal execution of the software program running on the monitored device; and
      the probabilistic software model.

3. The method of claim 2, wherein the probabilistic software model defines the hardware/software interaction events that are possible during the expected normal execution of the software program on the monitored device.

4. The method of claim 2 further comprising performing spectral monitoring on the signal to identify a loop or program module of program code in the actual execution of the software program running on the monitored device.

5. The method of claim 2 further comprising determining code blocks executed by the monitored device corresponding to the signal;
   wherein at least one code block is selected from the group consisting of a loop and a program module of program code.

6. The method of claim 5, wherein the probabilistic software model comprises one or more of a control flow graph at basic code block granularity, instruction-level representation of the program, and intermediate-representation of the program.

7. The method of claim 2, wherein the expected normal set of the sequence of hardware/software interaction events of the software program running on the monitored device is based upon a probabilistic hardware-software interaction model.

8. A method comprising:
   wirelessly receiving signals emanating from a monitored device, the signals reflective of a set of actual computational activities of the monitored device during a processing activity;
   determining a probability that the monitored device is compromised by evaluating variance between a set of predicted computational activities from a sequence model of the monitored device, which set of predicted computational activities are reflective of the processing activity of the monitored device that is uncompromised, to the set of actual computational activities, which provides a probability that an anomalous event exists within the actual computational activities of the monitored device; and
   transmitting data indicative of the probability that an anomalous event exists;
   wherein the sequence model tracks the states of the monitored device and at any given time considers both whether the received signals are likely to be produced by any of the states from training, and for each of the states, whether the state is allowed to follow a previous state of the monitored device; and
   wherein if the probability that an anomalous event evidences an actual anomalous event, the data indicative of the actual anomalous event comprises:
      at what point in the processing activity the anomalous event occurred;
      when the anomalous event occurred; and
      in which part of program code in the actual computational activities the anomalous event occurred.

9. The method of claim 8, wherein the sequence model defines a set of program executions that are possible during uncompromised computational activities on the monitored device, and defines a set of hardware/software interaction events that are possible at each point during the uncompromised computational activities on the monitored device.

10. The method of claim 8, wherein the set of predicted computational activities include program executions that are possible during uncompromised software execution on the monitored device.

11. The method of claim 8, wherein the set of predicted computational activities are predicted computational activities that are possible at each point during uncompromised software execution on the monitored device.

12. A method comprising:
modeling with a probabilistic software model possible sequences of hardware/software interaction events;
wirelessly receiving a signal emanating from a monitored device comprising hardware and running a software program, wherein the signal is representative of actual sequences of hardware/software interaction events of the software program running on the monitored device; and
comparing the actual sequences of hardware/software interaction events to the possible sequences of hardware/software interaction events, which provides a probability that an anomalous event exists within the actual sequences of hardware/software interaction events;

wherein the modeling with the probabilistic software model:
is representative of an expected normal set of sequences of hardware/software interaction events of the software program running on the monitored device;
accounts for how likely the possible sequences of hardware/software interaction events is for the software program running on the monitored device; and
tracks states of the monitored device and considers:
whether the received signal is likely to be produced by any of the states from training; and
for each of the states, whether the state is allowed to follow a previous state of the monitored device; and
wherein if the probability that an anomalous event evidences an actual anomalous event, the method further comprises:
determining when the anomalous event occurred; and
determining in which part of program code of the software program running on the monitored device the anomalous event occurred.

* * * * *